United States Patent
Goto et al.

(10) Patent No.: US 8,485,219 B2
(45) Date of Patent: Jul. 16, 2013

(54) FLOW RATE CONTROL USING MASS FLOW RATE CONTROL DEVICE

(75) Inventors: Takao Goto, Kuwana (JP); Makoto Tanaka, Mie (JP)

(73) Assignee: Hitachi Metals, Ltd., Tokyo (JP)

( * ) Notice: Subject to any disclaimer, the term of this patent is extended or adjusted under 35 U.S.C. 154(b) by 882 days.

(21) Appl. No.: 12/375,921

(22) PCT Filed: Aug. 2, 2007

(86) PCT No.: PCT/JP2007/065577
§ 371 (c)(1),
(2), (4) Date: Jan. 30, 2009

(87) PCT Pub. No.: WO2008/016189
PCT Pub. Date: Feb. 7, 2008

(65) Prior Publication Data
US 2010/0000608 A1    Jan. 7, 2010

(30) Foreign Application Priority Data

Aug. 3, 2006   (JP) ................................ 2006-212226

(51) Int. Cl.
*F16K 31/36*    (2006.01)
(52) U.S. Cl.
USPC ........................................ 137/487.5; 137/9
(58) Field of Classification Search
USPC ........................................ 137/487.5, 478.5
See application file for complete search history.

(56) References Cited

U.S. PATENT DOCUMENTS 5,062,446 A * 11/1991 Anderson ..................... 137/468
5,594,666 A    1/1997 Suzuki et al.
(Continued)

FOREIGN PATENT DOCUMENTS

| JP | 8-335118 | 12/1996 |
| JP | 2000-066732 | 3/2000 |

(Continued)

OTHER PUBLICATIONS

International Search Report dated Sep. 4, 2007 in International Patent Application No. PCT/JP2007/065577.

(Continued)

*Primary Examiner* — John Rivell
*Assistant Examiner* — Matthew W Jellett
(74) *Attorney, Agent, or Firm* — Beyer Law Group LLP

(57) ABSTRACT

It is possible to respecify the product (mass flow controller) corresponding to multiple types of actual process gases and multiple flow rate ranges, even after the mass flow controller has been shipped. With the mass flow rate control device in an initial state, calibration gas characteristic data is derived by measuring actual flow rate versus a flow rate setting signal using a calibration gas, and this calibration gas characteristic data is then saved to control unit. Meanwhile, actual gas characteristic data is derived by measuring actual flow rate versus a flow rate setting signal for each of a plurality of types of actual gas, and this actual gas characteristic data is then saved to a storage medium. Subsequently, prior to operating the mass flow rate control device, the actual gas characteristic data for an actual process gas is read from the storage medium via a computer, and the calibration gas characteristic data that was saved to the control unit is read out. The calibration gas characteristic data is then converted to controlled flow rate correction data based on the actual gas characteristic data, and the controlled flow rate correction data is saved to the control unit. Actual gas flow rate is corrected based on this controlled flow rate correction data.

15 Claims, 15 Drawing Sheets

U.S. PATENT DOCUMENTS

| | | | |
|---|---|---|---|
| 5,711,342 A * | 1/1998 | Kazama et al. | 137/486 |
| 5,911,238 A * | 6/1999 | Bump et al. | 137/487.5 |
| 5,944,048 A * | 8/1999 | Bump et al. | 137/487.5 |
| 5,975,126 A * | 11/1999 | Bump et al. | 137/487.5 |
| 6,119,710 A * | 9/2000 | Brown | 137/14 |
| 6,216,726 B1 * | 4/2001 | Brown et al. | 137/486 |
| 6,640,822 B2 | 11/2003 | Tinsley et al. | |
| 6,681,787 B2 * | 1/2004 | Tinsley et al. | 137/10 |
| 7,004,191 B2 * | 2/2006 | Shajii et al. | 137/487.5 |
| 7,243,035 B2 * | 7/2007 | Tison et al. | 702/100 |
| 7,434,477 B2 * | 10/2008 | Lull et al. | 73/861 |
| 7,720,617 B2 * | 5/2010 | Wang et al. | 702/45 |
| 7,826,986 B2 * | 11/2010 | McDonald | 702/45 |
| 8,010,303 B2 * | 8/2011 | Wang et al. | 702/45 |
| 2003/0000578 A1 * | 1/2003 | Lowery et al. | 137/487.5 |
| 2004/0030522 A1 | 2/2004 | Tison et al. | |
| 2006/0278276 A1 * | 12/2006 | Tanaka et al. | 137/487.5 |
| 2007/0107783 A1 * | 5/2007 | Lull et al. | 137/487.5 |
| 2008/0140260 A1 * | 6/2008 | Ding | 700/282 |

FOREIGN PATENT DOCUMENTS

| | | |
|---|---|---|
| JP | 2000-322130 | 11/2000 |
| JP | 2002-372443 | 12/2002 |
| JP | 2004-199245 | 7/2004 |
| JP | 2004-214591 | 7/2004 |

OTHER PUBLICATIONS

Friedli et al., "Tool and process improvements from MFC control system technology", vol. 45, Issue 4, Solid State Technology, Apr. 2002.

Hogan, "Going with the flow", Gases and Technology, Nov./Dec. 2002.

Shajii, "Model-based solution for multigas mass flow control with pressure insensitivity", Solid State Technology, Jul. 2004.

* cited by examiner

Fig.6

| MFC MODEL NO. | FULL SCALE FLOW RATE (N2 GAS) [SCCM] |
|---|---|
| 1 | ~ 5 |
| 2 | ~ 10 |
| 3 | ~ 20 |
| 4 | ~ 50 |
| 5 | ~ 100 |
| 6 | ~ 200 |
| 7 | ~ 500 |
| 8 | ~ 1,000 |
| 9 | ~ 2,000 |
| 10 | ~ 5,000 |
| 11 | ~ 10,000 |
| 12 | ~ 20,000 |
| 13 | ~ 50,000 |

FLOW RATE CONTROL USING MASS FLOW RATE CONTROL DEVICE

TECHNICAL FIELD

The present invention relates to flow rate control in a mass flow rate control device for measuring the mass flow rate of a relatively low-flow fluid such as a gas.

BACKGROUND ART

In semiconductor production systems of various kinds for producing semiconductor products such as semiconductor integrated circuits, it is typical for operations such as CVD and etching processes to be carried out repeatedly on semiconductor wafers etc. In such instances, owing to the necessity of precisely controlling the feed of a very small amount of process gas, mass flow rate control devices such as mass flow rate controllers are employed. In the description herein below, such a mass flow rate controller is taken by way of example.

In semiconductor production systems of this type, processes involving process gases of various kinds are carried out at flow rates ranging from extremely low flows to high flows. Thus, in semiconductor production systems of this type it will be desirable to employ mass flow rate control devices that are suitable for the gases used in the respective semiconductor production systems, and that are suitable for the flow ranges in which these are used in the respective semiconductor production systems. Also, it will be preferable for the flow rate of the flow actually controlled by the flow rate control valve (hereinafter sometimes called the "actual flow rate") to accurately accord with the mass flow rate (hereinafter sometimes simply called the "flow rate") indicated by a flow rate setting signal. To this end, it will be desirable to perform correction of the relationship between the flow rate setting signal and the actual gas flow rate.

In one example of the prior art, a process such as the following is carried out in a semiconductor production system that includes a chamber into which a plurality of gases inflow; a plurality of mass flow rate controllers provided in association with the plurality of gases; mass flow meters for measuring flow rates of the plurality of gases; and a plurality of valves for controlling the flows of the plurality of gases. Specifically, during operation of the semiconductor production system, the plurality of valves will open and close so that the plurality of gases inflow directly into the chamber. Meanwhile, during inspection of the mass flow rate controller, actual gas flow rates will be calculated on the basis of the set flow rate of the mass controller under inspection, and a conversion factor. The opening and closing of the plurality of valves will then be controlled so that gases inflow to a mass flow meter having an optimal flow rate range, from among the plurality of mass flow meters.

In the prior art semiconductor production system described above, actual flow rates of process gases are calculated on the basis of conversion factors. Typically, in the initial state prior to shipping, the mass flow rate controller manufacturer will use a calibration gas such as nitrogen gas to adjust each mass flow rate controller so that the linearity of its actual flow rate with respect to the flow rate setting signal lies within certain reference values. However, the physical properties of the nitrogen gas that is used for the adjustment differ from the actual process gases (e.g. argon) that will actually be used in the semiconductor production system at the shipping destination. For this reason, if mass flow rate controllers that have been adjusted using nitrogen gas as the calibration gas are used without further adjustment in a semiconductor production system at the shipping destination, the problem of inability to achieve linearity with the same accuracy as with nitrogen gas may arise.

For this reason, as in the prior art discussed above, corrections are made using a single conversion factor determined beforehand for each type of gas. However, actual flows of actual process gases (hereinafter sometimes called "actual gases") in the semiconductor production system at the shipping destination may give rise to discrepancies for which such conversion factors may not be able to fully compensate. Also, in the case of a wide full scale flow range from extremely small to large flow rates, in many instances even a mass flow rate controller that is adapted to a prescribed flow rate range will experience discrepancies in accuracy of control between a 100% full scale flow rate and a 10% full scale flow rate. In such instances as well, uniform compensation may not be possible with only a single conversion factor.

In this regard, if specialized equipment adapted to circulate a single type of gas were used in association with a mass flow rate controller adjusted for a flow rate range of a single flow rate zone, and if additionally calibration (adjustment of output characteristics of the flow rate sensor) were carried out using the actual gas, subsequent flow rate control of the actual gas would have good accuracy. However, such one-to-one correspondence between devices and types of gas is not realistic. In actual practice, given the number of different types of actual gases and of flow rate ranges, upwards of some 200 different models of mass flow rate controller would be required. This would not only present difficulties for the manufacturer, but also for the user, who would have to have maintain these different models in inventory.

With a view to addressing the above problems at least in part, an advantage of some aspects of the invention is to afford highly accurate flow rate control in a flow rate control device.

The specification of Japanese Patent Application 2006-212226 is incorporated herein by reference.

DISCLOSURE OF THE INVENTION

In a flow rate control correction method of a mass flow rate control device according to one aspect of the invention, a process like the following is carried out. In a mass flow rate control device furnished with mass flow sensing unit that senses mass flow of a gas flowing along a flow path and outputs a flow rate signal, a flow rate control valve mechanism that controls mass flow by varying the valve orifice through a valve actuation signal, and control unit for controlling the flow rate control valve mechanism on the basis of the flow rate signal and an externally input flow rate setting signal, a process like the following is carried out. Specifically, in the initial state of the mass flow rate control device, calibration gas characteristic data is obtained using a calibration gas by measuring the actual flow rate thereof versus an externally input flow rate setting signal, and this calibration gas characteristic data is saved to the control unit. Meanwhile, actual gas characteristic data is obtained for each of a plurality of types of actual gas by measuring the actual flow rate thereof versus an externally input flow rate setting signal, and this actual gas characteristic data is saved to a storage medium. Subsequently, prior to operating the mass flow rate control device, the actual gas characteristic data for the actual process gas that is to be actually used is read out from the storage medium via a computer. The calibration gas characteristic data that was saved to the control unit of the mass flow rate control device is read out as well. On the basis of the actual gas characteristic data, the calibration gas characteristic data is then converted to controlled flow rate correction data, and the controlled flow rate correction data is written to the control unit. The actual gas flow rate is then corrected on the basis of this controlled flow rate correction data.

The invention may be embodied in an aspect such as the following, for example. With the mass flow rate control device (mass flow rate controller) in the initial state, calibration gas characteristic data is obtained using a gas commonly employed as a calibration gas (e.g. nitrogen gas) by measuring the actual flow rate versus an externally input flow rate setting signal, and this data is saved to the mass flow rate controller. Specifically, the output characteristics of a flow rate sensor are measured and saved. Meanwhile, actual gas characteristic data is obtained for each of a plurality of types of actual process gas by measuring the actual flow rate versus an externally input flow rate setting signal, and this data is saved to a personal computer (PC) or a storage medium such as CD-ROM. The storage medium will be provided to the user as a so-called conversion software.

To operate the mass flow rate controller, the user will connect the personal computer (PC) and the mass flow rate controller; select the actual gas characteristic data for the actual gas for use in the process from among the actual gas characteristic data on the storage medium (conversion software); and read this gas characteristic data. The calibration gas characteristic data that was saved on the mass flow rate controller side will be read out and will undergo comparison and operations in relation to the aforementioned actual gas characteristic data, to effect respecification of the calibration gas characteristic data and bring it into accordance with the actual gas output characteristics. This process is a process that, in addition to correcting the output characteristics of the flow rate sensor (calibration gas characteristic data), serves to respecify the data in accordance with the actual gas output characteristics so as to improve accuracy of linearity when the actual gas is circulated. This respecified data will constitute the controlled flow rate correction data. This controlled flow rate correction data will be written to the control unit of the mass flow rate controller as an update saved to the mass flow rate controller. Subsequently, the mass flow rate controller will carry out flow rate control on the basis of the controlled flow rate correction data that has been converted in accordance with the actual gas output characteristics.

The flow rate control correction method of the mass flow rate control device of the present invention may be embodied in an aspect such as the following, for example. Specifically, the aforementioned actual gas characteristic data is calculated for each of a number of prescribed flow rate ranges, and saved to the storage medium. Then, actual gas characteristic data is selected in accordance with the full scale flow rate of the mass flow rate control device that is actually being operated, and the full scale flow rate of the flow rate range being used is corrected. According to this aspect, for hardware such as a mass flow rate controller having a wide full scale range serviceable up to high flow rates for example, controlled flow rate correction data will be generated on the basis of actual gas characteristic data of a medium flow rate range, for example. Through implementation in the aforementioned mass flow rate controller, the controller can be modified to a mass flow rate controller in which a medium flow rate range is the full scale flow rate. Consequently, even in instances where a mass flow rate controller appropriate to the full scale flow rate actually being controlled is not on hand, through respecification of the full scale flow rate highly accurate flow control will be possible for the required flow rate range.

Additionally, a thermal type flow rate sensor like the following could be employed as the mass flow sensing unit (flow rate sensor) mentioned previously. This thermal type flow rate sensor has heating wires wound around the upstream portion and the downstream portion of the sensor flow path. These heating wires constitute a bridge circuit. In this thermal type flow rate sensor, the flow rate of gas flowing within the sensor flow path can be calculated by sensing voltage imbalance arising due to gas flowing within the sensor flow path.

There could also be employed a pressure type flow rate sensor designed to calculate, with correction, the flow rate of gas flowing through the orifice under conditions with the pressure $P1$ of the gas at the orifice upstream portion and the pressure $P2$ of the gas at the orifice downstream portion held at critical condition (sonic range).

The flow rate control valve mechanism can employ a piezoelectric actuator that uses a layered type piezoelectric element.

According to the flow rate control correction method of the mass flow rate control device of this one aspect of the invention, a single mass flow rate controller can be respecified to give mass flow rate controllers having high accuracy in relation to multiple different types of actual process gases and multiple flow rate ranges. Exceptional working effects such as the following can be afforded thereby.
(1) The flow rate sensor will have improved linearity consistent with the output characteristics of the actual process gas actually used. Thus, highly accurate flow rate control will be possible.
(2) At the user end, the type of actual process gas and the flow rate range can be modified appropriately. This reduces the required inventory of spare mass flow rate controllers.
(3) For the manufacturer, the number product items can be kept to the minimum necessary. This will contribute to reduced inventory management and to shorter delivery times.

The present invention in another aspect can be embodied as a flow rate control device like the following, for controlling the flow rate of a gas flowing on a flow path. The flow rate control device comprises:

a flow rate sensing unit that senses as a sensed flow rate a mass flow rate of a gas flowing through a flow path;

a flow rate modifying unit that controls a flow rate of gas flowing through the flow path; and a control unit that performs feedback control of the flow rate modifying unit based on the sensed flow rate, and a target flow rate that is a target value for mass flow rate of the gas flowing on the flow path.

While referring to control data prepared according to a type of the gas flowing through the flow path and including a plurality of control parameters respectively associated with mutually different mass flow rates, the control unit controls the flow rate modifying unit using a control parameter determined based on at least one of the target flow rate and the sensed flow rate from among the plurality of control parameters.

According to this aspect, highly accurate flow rate control can be carried out at various flow rates, according to the gas that the flow rate control device is controlling.

Herein, "association with mass flow rates" is used to include not only an aspect whereby control parameters are associated directly with mass flow rates, but also instances in which they are associated indirectly with mass flow rates via other parameters (e.g. signals corresponding mass flow rates).

Additionally, control parameters can be used directly when the control unit controls the flow rate modification unit. On the other hand, in an aspect where there is another intervening arrangement between the control unit and the flow rate modification unit, and the control unit controls the flow rate modification unit via this arrangement, the control parameters may be those that the control unit uses to control the flow rate modification unit through control of the arrangement intervening between them. That is, the control parameters can be used in any form in control of the flow rate modification unit.

In one aspect, the flow rate sensing unit may sense the mass flow rate of the gas based on a quantity of heat transported by at least some of the gas flowing through the flow path.

In another aspect, the flow rate sensing unit may sense the mass flow rate of the gas based on pressures of the gas at different locations in the flow path.

It is preferable that the control data is data prepared individually for each of the flow rate control devices. According to this aspect, highly accurate flow rate control can be carried out in a manner that takes into consideration individual differences among flow rate control devices.

The flow rate control device may comprise a control data generating unit that generates the control data. The control data generating unit may preferably generate the control parameter based on the first and second characteristic parameters in order to generate the control data, while referring first and second characteristic data.

The first characteristic data may include a plurality of first characteristic parameters respectively associated with mutually different mass flow rates. The first characteristic parameters reflect characteristics of the each flow rate control devices premised on a use of a prescribed gas designated as a standard.

The second characteristic data may includes a plurality of second characteristic parameters respectively associated with mutually different mass flow rates. The second characteristic parameters reflect characteristics depending on the type of the gas premised on standard characteristics of the flow rate control devices.

According to this aspect, control data can be generated in a manner that takes into independent consideration the characteristics of individual flow rate control devices (e.g. production errors or changes over time) and the characteristics of different gases (the characteristics of gases qua physical substances). Thus, identical second characteristic data can be implemented for separate individual flow rate control devices of the same model. Characteristic data sets may be supplied externally, or kept by the flow rate control device.

In preferred practice the aforementioned second characteristic data may be data selected from the following multiple sets of data, according to the type of gas flowing on the flow path. The multiple sets of data are a plurality of sets of second characteristic candidate data in which the second characteristic parameters are respectively stored. The sets of second characteristic candidate data reflect characteristics of mutually different types of gas.

According to this aspect, by selecting an appropriate second characteristic parameter according to the type of gas (substance) gas controlled by the flow rate control device, the flow rate control device can be set up for highly accurate control of various different types of gases.

In preferred practice the aforementioned second characteristic data will be data selected from the following multiple sets of data, according to the flow rate of gas flowing on the flow path. The multiple sets of data are a plurality of sets of second characteristic candidate data in which the second characteristics are respectively stored. The mass flow rates of the second characteristic parameters respectively stored in each of the plurality of sets of the second characteristic candidate data have mutually different ranges.

According to this aspect, by selecting an appropriate second characteristic parameter according to the flow rate range of the gas controlled by the flow rate control device, the flow rate control device can be set up for highly accurate control of gas for various different flow rate ranges.

It is preferable that the flow rate control device includes:
a first storage unit that stores the first characteristic data; and
a second storage unit that stores the second characteristic data.

Data on the second storage unit can be swapped or updated more easily than that on the first storage unit.

According to this aspect, as appropriate according to the type or flow rate range of the gas controlled by the flow rate control device, the storage unit that saves the second characteristic data can be swapped, or the second characteristic data that has been saved to the second storage unit can be updated.

In one aspect, the control unit may generate a corrected target flow rate based on the target flow rate and a control parameter that is determined based on at least one of the sensed flow rate and the target flow rate from among the plurality of control parameters; and may perform the control of the flow rate modifying unit based on the corrected target flow rate and the sensed flow rate. The control parameter can be determined from among the plurality of control parameters on the basis of at least one of the mass flow rate of the aforementioned target flow rate and the mass flow rate representing the sensed flow rate.

In another aspect, the control unit may generate a corrected sensed flow rate based on the sensed flow rate and a control parameter that is determined based on at least one of the sensed flow rate and the target flow rate from among the plurality of control parameters; and may perform the control of the flow rate modifying unit based on the target flow rate and the corrected sensed flow rate.

The present invention in another aspect can be embodied as a method for controlling the flow rate of a gas flowing through the flow path. In this method, the following processes will be carried out. The processes described below may be carried out in a different order, provided that they are not steps that utilize outcomes of other steps.

(a) A flow rate control device is provided. The flow rate control device is configured to perform feedback control of a flow rate of a gas flowing on a flow path based on a target flow rate that is a target value for mass flow rate of the gas flowing on the flow path, and a sensed flow rate that is a sensed mass flow rate of the gas flowing on the flow path.

(b) The control data is provided. The control data includes a plurality of control parameters respectively associated with mutually different mass flow rates. The data is provided according to a type of the gas flowing on the flow path.

(c) The flow rate of the gas flowing on the flow path is controlled using the flow rate control device and referring to the control data, based on the target flow rate, the sensed flow rate, and a control parameter that is determined based on at least one of the target flow rate and the sensed flow rate from among the plurality of control parameters.

According to this aspect as well, using the flow rate control device, highly accurate flow rate control can be carried out according to the type of gas whose flow rate is being controlled.

In preferred practice, the following processes will take place in the aforementioned step (b).

(b1) First characteristic data is provided. The first characteristic data includes a plurality of first characteristic parameters respectively associated with mutually different mass flow rates. The first characteristic parameters reflect characteristics of the provided flow rate control device premised on a use of a standard gas.

(b2) Second characteristic data is provided. The second characteristic data includes a plurality of second characteristic parameters respectively associated with mutually different mass flow rates. The second characteristic parameters reflect characteristics depending on the type of the gas premised on standard characteristics of the flow rate control device.

(b3) With reference to the first and second characteristic data, the control parameter is generated based on the first and second characteristic parameters in order to generate the control data.

According to this aspect, on the basis of two separate sets of data, namely, first characteristic data that reflects characteristics of the flow rate control device and second characteristic data that reflects characteristics of the gas, control data that reflects both the characteristics of the flow rate control device and the characteristics of the gas can be generated. For different individual flow rate control devices of the same model, identical second characteristic data can be used. At this time, in preferred practice, first characteristic data may be data provided according to each flow rate control device and reflecting the characteristics of each flow rate control device.

In preferred practice, the following processes will take place in the aforementioned step (b1).

(b4) The target flow rate is input to the flow rate control device.

(b5) The standard gas is circulated through the flow path and causing the flow rate control device to control the flow rate of the standard gas without using the control parameter.

(b6) the sensed flow rate is derived.

(b7) The first characteristic parameter is generated based on the input target flow rate and the derived sensed flow rate.

(b8) The steps (b4) to (b7) are repeated for different target flow rates to generate the plurality of first characteristic parameters.

According to this aspect, it is possible to generate first characteristic data that reflects the characteristics of a flow rate control device premised on the use of a standard gas.

In preferred practice, the following processes will take place in the aforementioned step (b2).

(b9) A standard flow rate control device is provided. The standard flow rate control device is configured to perform feedback control of flow rate of a gas flowing on a standard flow path based on a standard target flow rate that is a target value for mass flow rate of the gas flowing on the standard flow path, and a standard sensed flow rate that is sensed mass flow rate of the gas flowing on the standard flow path.

(b10) The standard target flow rate is input to the standard flow rate control device.

(b11) A gas different from the standard gas is circulated through the standard flow path and causing the standard flow rate control device to control the flow rate of the gas.

(b12) The standard sensed flow rate is derived.

(b13) The second characteristic parameter is generated based on the input standard target flow rate and the derived standard sensed flow rate.

(b14) The steps (b10) to (b13) are repeated for different standard target flow rates to generate the plurality of second characteristic parameters.

According to this aspect, it is possible to generate second characteristic data that reflects the characteristics of a gas, premised on standard flow rate control device characteristics.

In preferred practice, the following additional process will take place in the aforementioned step (b2).

(b15) prior to steps (b10) to (b14), the step (b1) is carried out for the standard flow rate control device to prepare the first characteristic data in relation to the standard flow rate control device.

In preferred practice, the following additional process will take place in the aforementioned step (b11).

The standard flow rate control device is caused to control the flow rate of the gas using the first characteristic data in relation to the standard flow rate control device.

According to this aspect, it will be possible to generate second characteristic data that minimizes the effects of discrepancies arising from individual differences (e.g. production errors) of the standard flow rate control devices.

The second characteristic parameter can also be generated by carrying out the aforementioned step (b11), without using the first characteristic parameter relating to a standard flow rate control device. In preferred practice, in such an aspect, there may be provided a standard flow rate control device having desirable characteristics that more closely approximate design values than does the flow rate control device provided in step (a).

In preferred practice, the following process will take place in the aforementioned step (b2).

(b16) The step (b14) is carried out for a plurality of types of gas in order to generate a plurality of sets of the second characteristic data relating to the plurality of types of gas.

In preferred practice, the following process will take place in the aforementioned step (b3).

(b17) some of the second characteristic data is/are selected from among the plurality of sets of second characteristic data according to the type of the gas controlled by the flow rate control device provided in the step (a), as the second characteristic data to be used for reference. Herein, a "gas controlled by the flow rate control device" refers to a gas whose flow rate is controlled by a flow rate control device during manufacture of a product using the flow rate control device by the user of the flow rate control device.

According to this aspect, the flow rate control device can be set up so as to carry out highly accurate control of a gas undergoing actual flow rate control by the flow rate control device.

In preferred practice, the following additional process will take place in the aforementioned step (b2).

(b18) A plurality of sets of the second characteristic data are generated. The plurality of sets of the second characteristic data respectively include some of the plurality of second characteristic parameters generated in the step (b14). The plurality of sets of the second characteristic data have mutually different ranges of the standard target flow rate during generation of the respectively included second characteristic parameters.

In preferred practice, the following additional process will take place in the aforementioned step (b3).

(b19) According to the range of flow rates of gas controlled by the flow rate control device provided in the step (a), some of the second characteristic data is/are selected from among the plurality of sets of second characteristic data, as the second characteristic data to be used for reference.

According to this aspect, the flow rate control device can be set up so as to carry out highly accurate flow rate control for various different flow rate ranges.

In preferred practice, the following process takes place in the aforementioned step (b1). The first characteristic data is saved to a first storage unit of the flow rate control device provided in the step (a). The following process further takes place in the aforementioned step (b2). The second characteristic data is saved to a second storage unit on which data can be swapped or updated more easily than that on the first storage unit. The following process further takes place in the aforementioned step (b3). The first characteristic data is read from the first storage unit. The second characteristic data is read from the second storage unit.

In preferred practice, the following process takes place in the aforementioned step (c). A corrected target flow rate is generated based on the target flow rate and a control parameter that is determined based on at least one of the sensed flow rate and the target flow rate from among the plurality of control parameters. Feedback control of the flow rate of gas flowing through the flow path is performed based on the corrected target flow rate and the sensed flow rate.

According to this aspect, highly accurate flow rate control can be carried out at various flow rates, according the gas being controlled by the flow rate control device.

It is possible for the present invention to be embodied in a number of different aspects, for example, a flow rate control correction method and flow rate control correction device; a flow rate control method and flow rate control device; a computer program for accomplishing the functions of such a method or device; a recording medium having such a computer program recorded thereon; or a computer program product.

These and additional objects, arrangements, and advantages of the present invention will be more clearly understood from the following detailed description of the preferred embodiments.

BRIEF DESCRIPTION OF THE DRAWINGS

FIG. 6 is a diagram depicting and example of flow rate range division in the present invention;

BEST MODE FOR CARRYING OUT THE INVENTION

A. First Mode of Embodiment:

The mass flow rate control device and the mass flow rate control method according to the first mode of the present invention will be described below with reference to the accompanying drawings.

Figure 1:
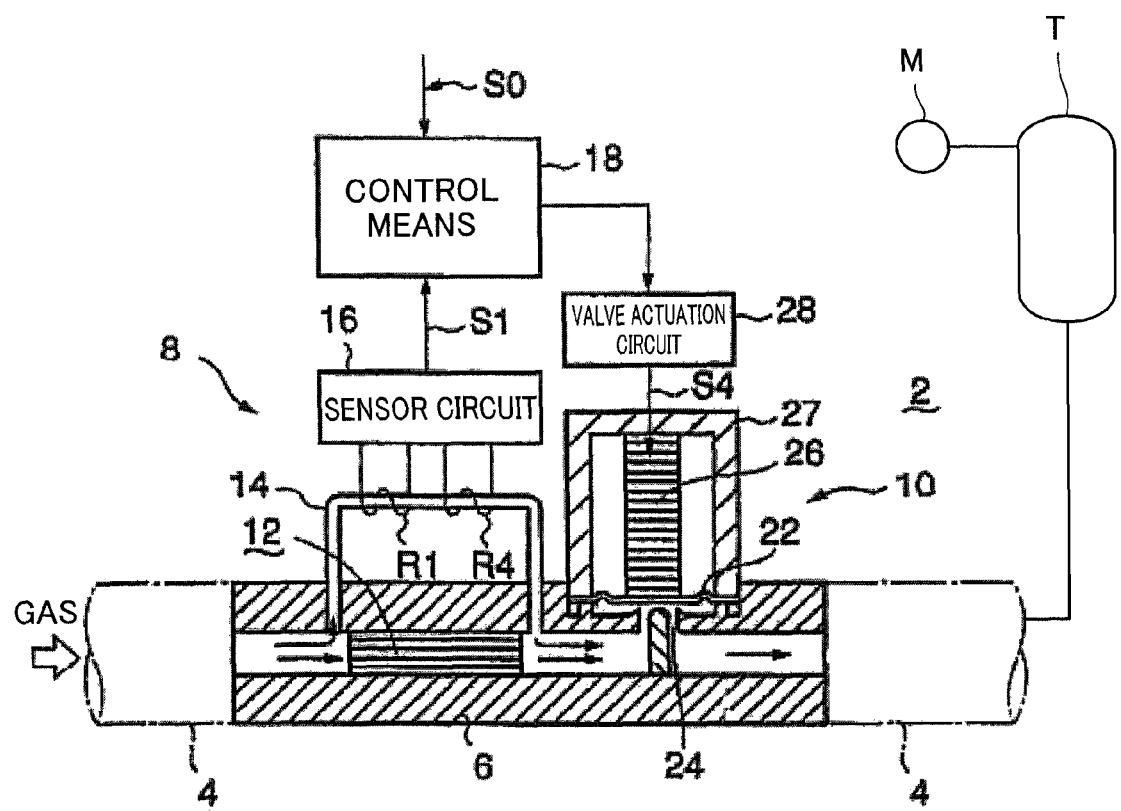
FIG. 1 is a simplified schematic illustrating the configuration of a mass flow rate control device (mass flow rate controller) according to the first mode of the present invention.
Figure 2:
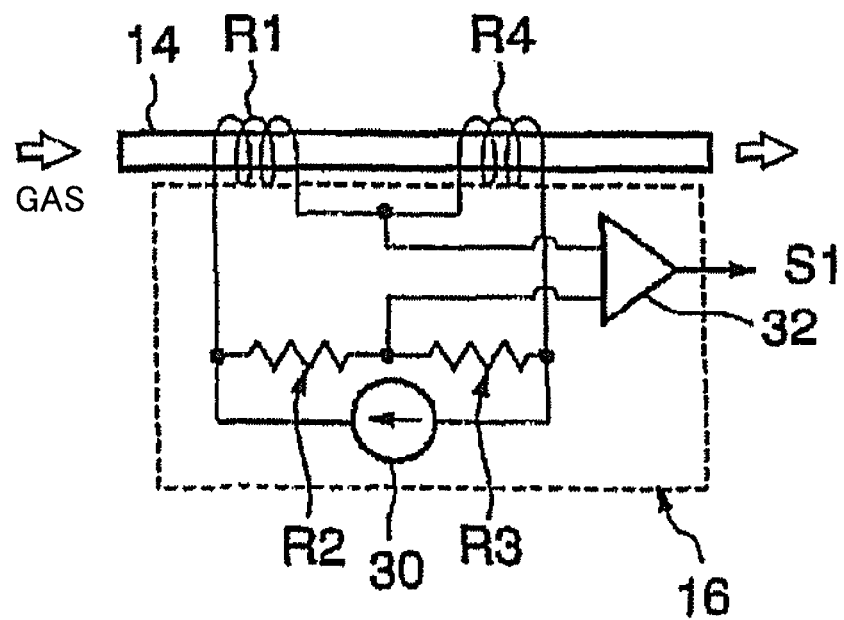
FIG. 2 is a circuit diagram illustrating a thermal type mass flow rate sensor.

A1. Configuration and Functions of Mass Flow Rate Control Device:

First, the mass flow rate control device, namely a mass flow controller, will be described referring to FIGS. 1 and 2. FIG. 1 is a simplified illustration depicting the configuration of the mass flow rate controller. FIG. 2 is a schematic illustrating a thermal type mass flow rate sensor.

In FIG. 1, 4 denotes a fluid passage furnished with intervening a mass flow controller 2. A process gas source is connected to a first end of the fluid passage 4; and a gas-consuming system, such as the deposition unit of a semiconductor production system, is connected to the other end. The mass flow controller 2 includes a flow rate sensor 8 provided as mass flow rate sensing unit for sensing the mass flow rate of fluid flowing through a flow path and for outputting a flow rate signal (sensor output signal) S1; a flow rate control valve mechanism 10 for controlling the mass flow rate by varying the valve orifice according to a valve actuation signal S4; and a series of control unit 18, such as control circuits etc., adapted to output the valve actuation signal S4 on the basis of an externally input flow rate setting signal S0 and the aforementioned flow rate signal S1, and to control the flow rate control valve mechanism 10. "Mass flow rate" refers to the mass of a fluid flowing per unit time.

The flow rate control valve mechanism 10 is composed of a flow rate control valve 27 having a metal diaphragm 22 and an actuator 26 having a layered piezoelectric element for pushing this diaphragm by a minute stroke. The flow rate control valve mechanism 10 is designed to adjust the orifice of the valve port 24 using the metal diaphragm 22 to control the flow rate of gas. The control unit 18 has the functions of performing, with the flow rate control circuit, comparison of and operations on the externally input flow rate setting signal S0 and the sensor output signal S1 that was input via a flow rate sensor circuit 16; performing PID control so as to bring the two signals into agreement; and controlling the valve orifice. The flow rate of fluid flowing through the fluid passage 4 is controlled by the flow rate control valve mechanism 10.

The fluid passage 4 on the upstream side of the flow rate control valve mechanism 10 divides into a bypass flow path 12 composed of an assemblage of narrow pipes, and a sensor flow path 14 composed of a narrow pipe diverging therefrom and extending parallel therewith. In terms of design, the two flow paths 12, 14 are constituted so that gas flows through them at a fixed split ratio determined beforehand. Two heat-emitting resistance wires R1, R4 constituting part of the flow rate sensor circuit (the bridge circuit of FIG. 2) are wound onto the sensor flow path 14.

The heat-emitting resistance wires R1, R4 have the property of changing resistance value with increasing temperature. As depicted in FIG. 2, the heat-emitting resistance wires R1, R4 are designed to be in an equilibrium state electrically with respect to other resistors R2, R3. Thus, transport of heat occurring due to flow of gas from the upstream portion towards the downstream portion can be tracked as voltage imbalance of the bridge circuit, whereby the gas flow rate through the sensor flow path 14 can be derived, and the flow rate through the flow path as a whole can be computed.

The flow rate signal S1 output from the flow rate sensor circuit 16 is a voltage value contained within a given range, and represents the flow rate measured with respect to full scale. The flow rate signal S1 typically represents the flow rate, within a range of between 0 and 5 V (volts). This flow rate signal S1 is input to the flow rate control unit 18.

Meanwhile, when an actual gas is used, the required gas flow rate is input, in the form of the flow rate setting signal S0, to the flow rate control unit 18. This flow rate setting signal S0 is also a voltage value contained within a given range, and represents a target flow rate with respect to full scale. The flow rate signal S0 typically represents the flow rate, within a range of between 0 and 5 V (volts).

Using a PID control method, the flow rate control unit 18 controls a valve actuation circuit 28 to adjust the valve orifice of the flow rate control valve mechanism 10 so that the values of the aforementioned flow rate signal (sensor output signal) S1 and the flow rate setting signal S0 are in agreement. The valve actuation signal S4 is output from the valve actuation circuit 28 to the flow rate control valve 27, and the flow rate is controlled by the flow rate control valve 27 in accordance with the valve actuation signal S4.

In the event that, for example, full scale is 100 ccm (cubic centimeters per minute), the valve orifice is controlled so that if the flow rate setting signal S0 (which represents a target flow rate) is set to 5 V, the flow rate signal S1 (which represents measured flow rate) indicates 5 V. As a result, the flow rate through the fluid passage as a whole (i.e. the sum of the flow rate through the bypass flow path 12 and the flow rate through the sensor flow path 14) is 100 ccm. However, in the event that the output characteristics of the flow rate sensor and the sensor output characteristics in relation to the actual gas have not been adjusted, there will be a very small (e.g. ±1 to 2%) discrepancy of the flow rate from 100 ccm.

A2. Outline of Correction Method of Mass Flow Rate Control Device:

A flow rate control correction method for adjusting to correct such discrepancy will be described in general outline below with reference to the following drawings.

Figure 3A:
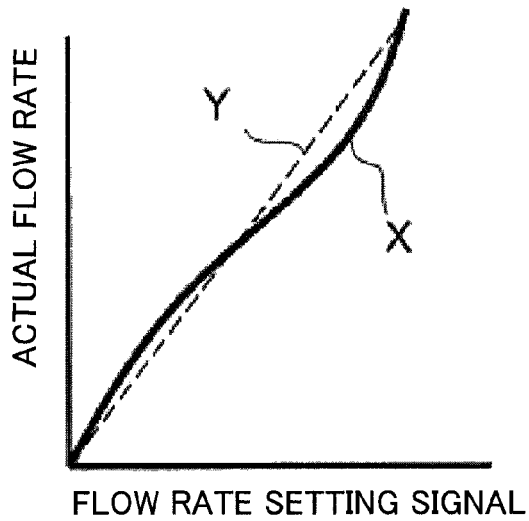
FIGS. 3A to 3C are outline diagrams illustrating the flow rate control correction method of the first mode of the present invention on the basis of flow rate characteristic line diagrams.
Figure 3B:
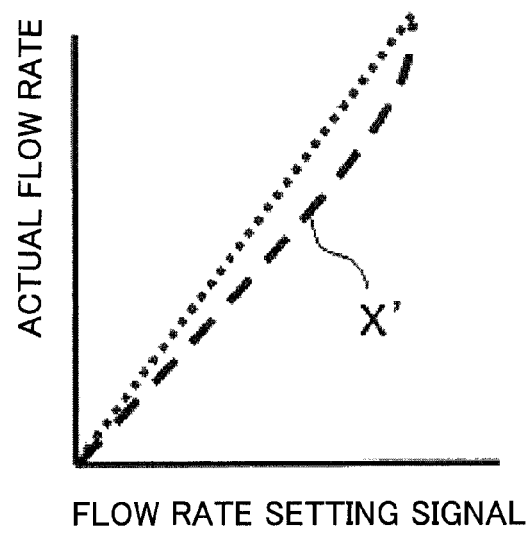
Figure 3C:
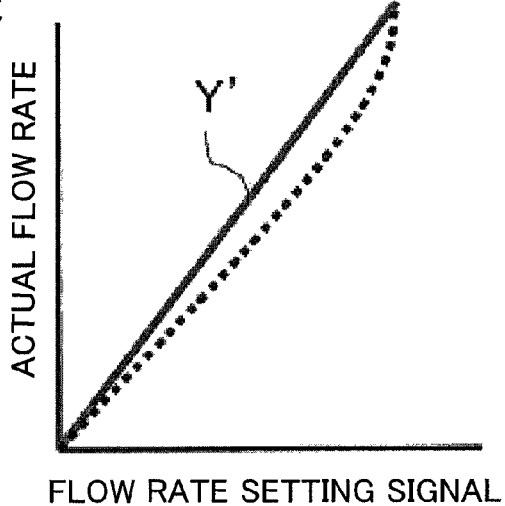
Figure 4:
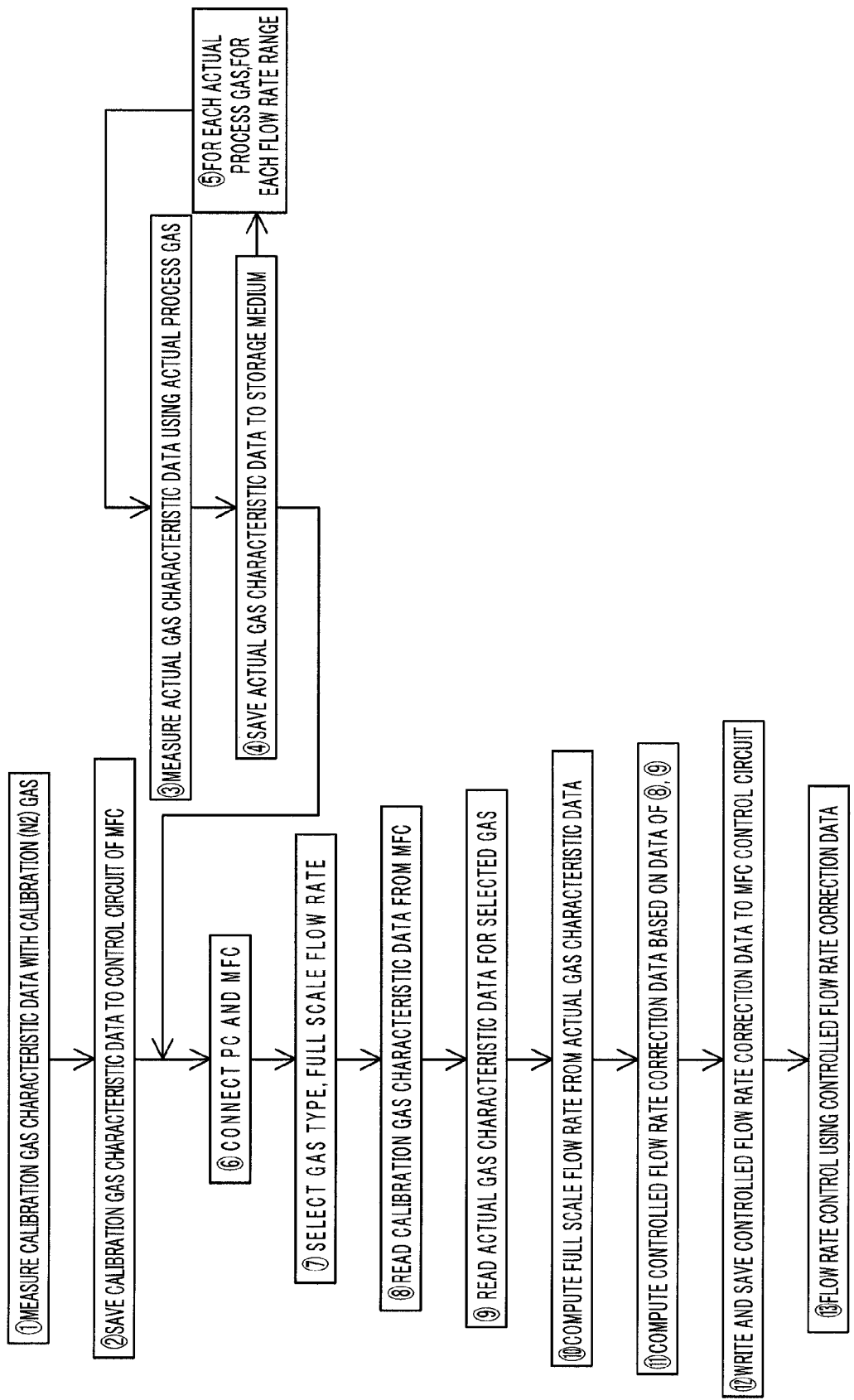
FIG. 4 is a flowchart depicting the process sequence of the flow rate control correction method of the first mode of the present invention.
Figure 5:
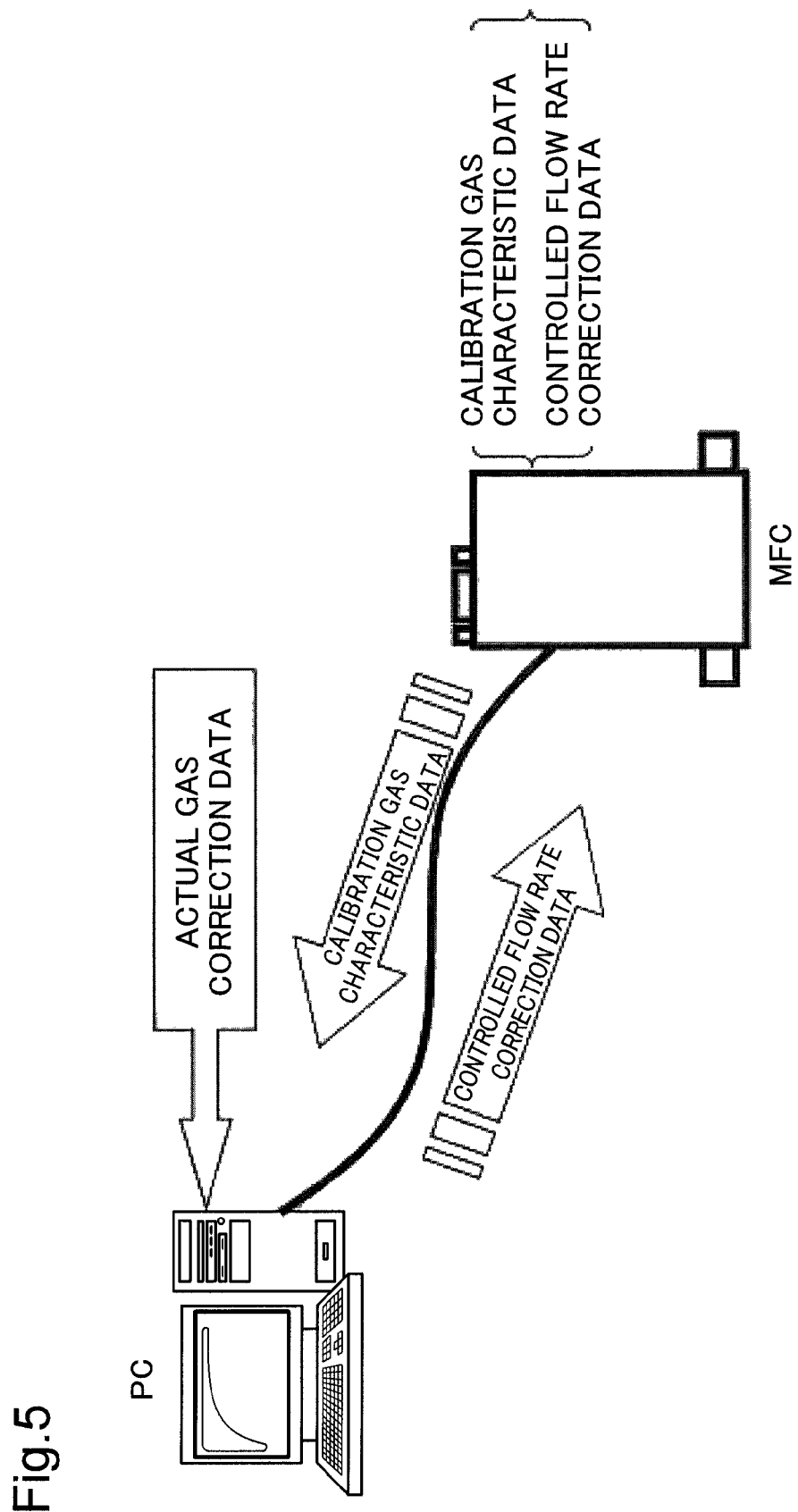
FIG. 5 is an image diagram depicting a respecification mode of the first mode of the present invention.

FIGS. 3A to 3C are outline diagrams illustrating the flow rate control correction method of the first mode of the present invention on the basis of flow rate characteristic line diagrams. FIG. 4 is a flowchart depicting the process sequence. FIG. 5 is an image diagram depicting a respecification mode.

In the characteristic line diagrams of FIGS. 3A to 3C, the horizontal axis indicates the flow rate setting signal S0 and the vertical axis indicates the actual flow rate. In FIG. 3A, the solid line X is an example of calibration gas characteristic data obtained using nitrogen ($N_2$) as the calibration gas, by measuring the actual flow rate versus the externally input flow rate setting signal S0 with externally provided flow rate measuring unit (in FIG. 1, a tank T, and a manometer M able to measure internal pressure of the tank T). Expressed in terms of the process sequence of FIG. 4, the process of measuring this calibration gas characteristic data corresponds to Step (1) (this labeling convention will be employed hereinbelow. In FIG. 4, the number of each step is indicated by a circled numeral). This calibration gas characteristic data is stored in table form in the control unit (control circuits) 18 of the mass flow controller (MFC) (FIG. 4—Step (2)). The processes of Steps (1) and (2) are carried out for each individual mass flow rate control device.

The output characteristics of the flow rate sensor obtained in Step (1) of FIG. 4 has a modicum of discrepancy as shown by the solid line X, and lacks high linearity as depicted by Y in FIG. 3A, and not afford high accuracy control outcomes.

The reason such discrepancy occurs is that conditions differ among individual flow rate sensors. To some extent the occurrence of such discrepancy is physically unavoidable.

In Step (3) of FIG. 4, using the same method as in Step (1) described previously, actual gas characteristic data is obtained with the process gases that will actually be used (Ar, $SF_6$, $Cl_2$ etc.) by measuring actual flow rates versus the flow rate setting signal S0 with the externally provided flow rate measuring unit (FIG. 4—Step (3)). Then, in Step (4) of FIG. 4, this actual gas characteristic data is saved to a personal computer (PC) or a memory medium such as CD-ROM. This data will serve as conversion software for the purpose of modifying settings of the mass flow rate control device according to the type and flow rate range of actual gas.

This actual gas characteristic data are calculated individually for each actual gas actually used, and for each of a number of prescribed flow rate ranges, and saved in table format (FIG. 4—Step (5)). Generation of this actual gas characteristic data is not carried out on an individual mass flow rate control device basis. That is, actual gas characteristic data for individual actual gases and individual flow rate ranges are measured using a single benchmark mass flow rate control device (herein also referred to as a "standard flow rate control device") that has been adjusted premised on the use of the calibration gas to ensure linearity of the characteristics. The measured actual gas characteristic data is implemented on a mass flow rate control device of the same model. Thus, in FIG. 4, the processes of Steps (3) to (5) are shown separately from Steps (1), (2), and (6) through (13) which are executed for individual mass flow rate control devices.

Flow rate range refers to a range of flow rates at which the hardware, namely the mass flow rate control device, can control the flow rate. For example, several flow rate ranges and their respective full scale flow rates are shown in FIG. 6. The divisions of FIG. 6 establish 13 flow rate ranges, for flow rates from 0 to 50,000 [SCCM]. That is, by providing 13 different types of mass flow controller having the flow rate ranges shown in FIG. 6, it will be possible using actual gas characteristic data to carry out correction for flow rate control of these mass flow controllers, within the full scale flow rates shown in FIG. 6. Specifically, using these 13 different types of mass flow controller, flow rate control can be carried out at flow rates of from 0 to 50,000 [SCCM]. [SCCM] (Standard Cubic Centimeter per Minute) refers to the CCM (Cubic Centimeter per Minute) under a standard condition, specifically, 0° C. and 1 ATM.

For example, if a mass flow controller having flow rate range No. 10 is employed, correction can be carried out based on actual gas data, for flow rate control up to the full scale flow rate of 5,000 [SCCM]. However, in actual practice there are limits as to the control range, due to structural factors of the flow rate control valve of the mass flow controller. For this reason, correction can be carried out based on actual gas data, for a flow rate range up to about one-third of the listed full scale flow rate, in this case, approximately 2,001 or above for example. As a result, through implementation of actual gas data, a mass flow controller having flow rate range No. 10 can be respecified to a mass flow controller that will afford highly accurate flow rate control over full scale flow rates of between about 2,001 and 5,000 [SCCM].

Prior to actually using the mass flow controller in question, the user connects the personal computer PC to the mass flow controller with a data communications circuit (RS-232C, RS-485 etc.) as depicted in FIG. 5 (FIG. 4—Step (6)). From among options shown on a display 330 in the personal computer P, the user selects via an input device such as a mouse or keyboard 340 a gas for actual use and a full scale flow rate for use (FIG. 4—Step (7)).

Next, the calibration gas characteristic data that was saved in Step (2) is read out to the personal computer PC from the control circuit of the mass flow controller (FIG. 4—Step (8)). Additionally, the conversion software on the memory medium obtained in Step (4) is loaded to the PC, and the actual gas characteristic data for the gas type that was selected above is read out from the memory medium (FIG. 4—Step (9)). Computation of a full scale flow rate for conversion from among the actual gas characteristic data is then carried out (FIG. 4—Step (10)).

Next, controlled flow rate correction data is derived through operations based on the data of Steps (8) and (9) (FIG. 4—Step (11)). This controlled flow rate correction data is written to the control circuit on the mass flow controller side, to update the saved controlled flow rate correction data (FIG. 4—Step (12)). Consequently, both the calibration gas characteristic data and the controlled flow rate correction data are saved to the control unit of the mass flow controller.

Subsequently, in the mass flow controller flow rate control involving correction on the basis of this controlled flow rate correction data are carried out (FIG. 4—Step (13)).

Consequently, as the flow rate sensor output characteristics, the calibration gas characteristic data line diagram X of FIG. 3A is corrected on the basis of actual gas characteristic data, and converted to controlled flow rate correction data.

FIG. 3B is an example of data obtained through measurement of actual flow rate of nitrogen ($N_2$) versus the externally input flow rate setting signal S0, by the externally provided flow rate measuring unit (see the tank T and the manometer M in FIG. 1). In the example of FIG. 3B, flow rate control is corrected on the basis of controlled flow rate correction data.

FIG. 3C is an example of data obtained through measurement of flow rate of an actual gas versus the externally input flow rate setting signal S0, by the externally provided flow rate measuring unit T, M. As a result of correction of flow rate control on the basis of controlled flow rate correction data, a sensor exhibiting characteristics shown by the dotted line X' in FIG. 3B versus nitrogen ($N_2$) exhibits characteristics similar to those indicated by the solid line Y' in FIG. 3C, when actual gas is circulated. That is, highly accurate flow rate control can be carried out for the actual gas.

While the use of a conversion factor was not discussed above, it would be acceptable for correction by a conversion factor and correction according to the present mode of embodiment to be carried out concomitantly.

As will be appreciated from the above, according to the flow rate control device of the present mode of embodiment, sensor output characteristics observed with nitrogen gas are corrected on the basis of the actual gas, thus affording highly accurate flow rate control utilizing very high linearity.

In the event that the mass flow controller is subsequently used for another process gas, the calibration gas characteristic data is converted to data for the new actual gas (process gas) by a procedure similar to the above, to create new controlled flow rate correction data.

Figure 7:
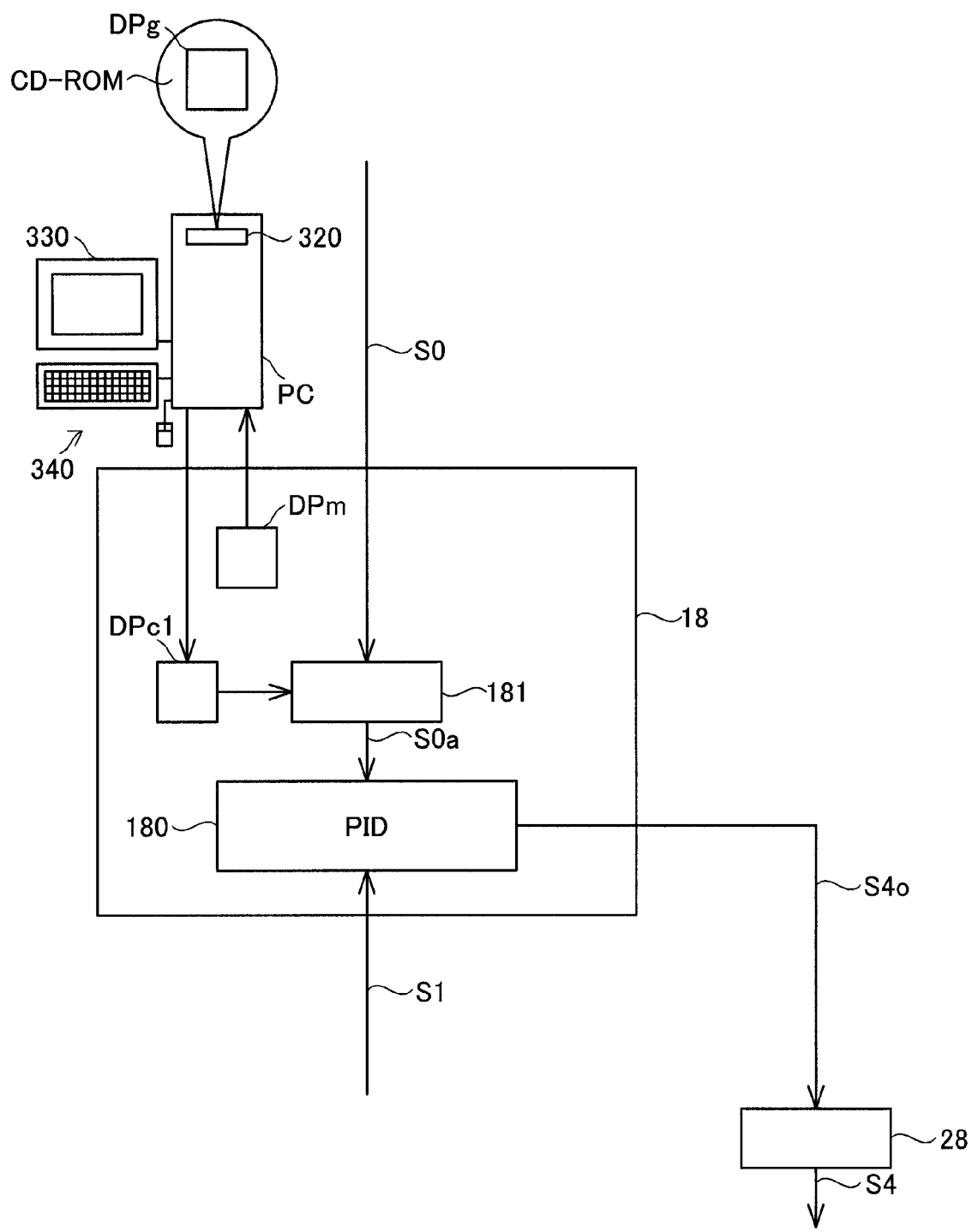
FIG. 7 is a block diagram depicting in detail configuration by control unit 18.

With regard to flow rate range as well, even where the same given mass flow controller is employed as the hardware, service at different flow rate ranges is possible through respecification of the full scale flow rate only, by optimizing characteristics on the basis of actual gas characteristic data. A3. Specifics of Correction Method of Mass Flow Rate Control Device:

(1) Basic Principle of Correction Method of Mass Flow Rate Control Device:

FIG. 7 is a block diagram depicting in detail the configuration of the control unit 18. The control unit 18 is provided with a control circuit 180 and a correction module 181. The control unit 18 stores the calibration gas characteristic data DPm and the controlled flow rate correction data DPc1 in a semiconductor memory which has been provided to the control unit.

As noted above, during generation of controlled flow rate correction data DPc1, the personal computer PC receives calibration gas characteristic data DPm from the control unit 18. Via a CD-ROM drive 320 provided to the personal computer PC, the personal computer PC reads out the actual gas characteristic data DPg from the CD-ROM recording medium. The personal computer PC then corrects the calibration gas characteristic data DPm on the basis of the actual gas characteristic data DPg, and generates controlled flow rate correction data DPc1. Generation of this controlled flow rate correction data DPc1 will be discussed in detail later.

The correction module 181, while referring to the controlled flow rate correction data DPc1, modifies the externally input flow rate setting signal S0 to a corrected flow rate setting signal S0a. The corrected flow rate setting signal S0a is an input signal adapted to enable the control circuit 180 to generate an output signal S4o that brings the actual flow rate of actual gas flowing in the fluid passage 4 (see FIG. 1) into close approximation with the target flow rate indicated by the flow rate setting signal S0. Generation of this corrected flow rate setting signal S0a will be discussed in detail later.

The control circuit 180 outputs the output signal S4o and controls the valve actuation circuit 28 so that the corrected flow rate setting signal S0a representing the corrected target flow rate and the sensor output signal S1 representing the measured flow rate are brought into agreement. The valve actuation circuit 28 generates a valve actuation signal S4 on the basis of the output signal S4o, and outputs the signal to the flow rate control valve 27 (see FIG. 1). On the basis of the valve actuation signal S4, the flow rate control valve 27 controls the flow rate of the gas passing through the fluid passage 4. Specifically, the control circuit 180 uses the output signal S4o to control the flow rate of gas through the fluid passage 4. As noted above, the control circuit performs PID control.

Figure 8:
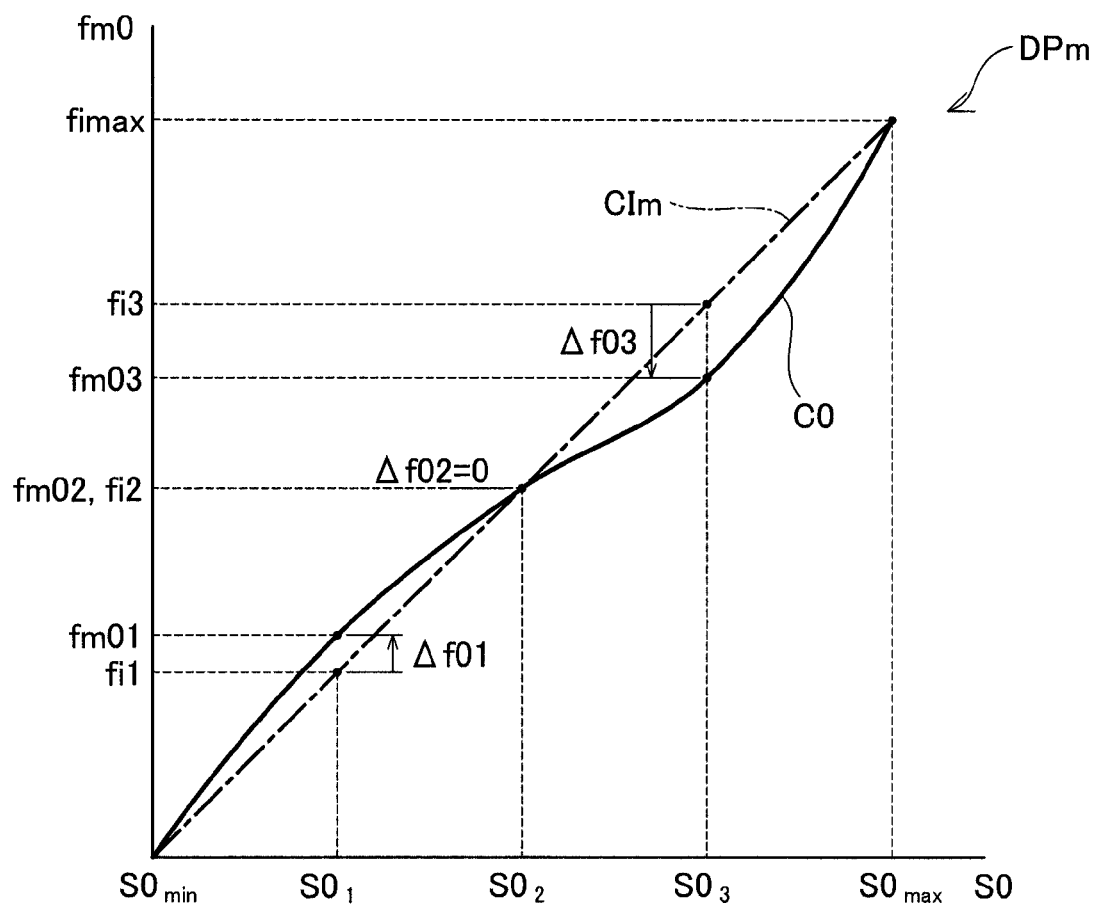
FIG. 8 is a graph representing calibration gas characteristic data DPm of a mass flow rate control device MFC0 according to a mode of embodiment.

FIG. 8 is a graph representing calibration gas characteristic data DPm of the mass flow rate control device MFC0 according to the present mode of embodiment. The horizontal axis in FIG. 8 represents magnitude of the flow rate setting signal S0. The vertical axis represents actual calibration gas flow rates (measured values) fm0 at each value of the flow rate setting signal S0. FIG. 8 is a graph that is basically identical to FIG. 3A.

The gas circulated through the fluid passage 4 when the calibration gas characteristic data DPm shown in FIG. 8 is obtained is nitrogen gas ($N_2$) employed as the calibration gas. The flow rate of the gas circulated through the fluid passage 4 is measured by a flow rate measuring device installed downstream from the mass flow rate control device MFC0 of the present mode of embodiment. When the calibration gas characteristic data DPm shown in FIG. 8 is obtained, the correction module 181 of the mass flow rate control device MFC0 outputs the flow rate setting signal S0 with no further modification as the corrected flow rate setting signal S0a. Flow rate values are measured after control by the control circuit 180 has assumed a stable state, that is, after the difference between the corrected flow rate setting signal S0a and the sensor output signal S1 is equal to or less than a prescribed value.

In FIG. 8, the curve C0 is a graph representing calibration gas characteristic data DPm in the mass flow rate control device MFC0 of the present mode of embodiment. The straight line Clm, on the other hand, is a graph representing calibration gas characteristic data in an ideal mass flow rate control device MFCi.

In the example of FIG. 8, when the flow rate setting signal S0 is $S0_1$ for example, the actual flow rate fm0 in the mass flow rate control device MFC0 is a value fm01 greater by $\Delta f01$ than an ideal value of fi1. When the flow rate setting signal S0 is $S0_3$, the actual flow rate fm0 is a value fm03 smaller by $\Delta f03$ than an ideal value of fi3. When the flow rate setting signal S0 is $S0_2$, the actual flow rate fm0 is a value close to an ideal value of fi2. When the flow rate setting signal S0 is $S0_{min}$ or $S0_{max}$, the actual flow rate fm0 is identical to the respective ideal values.

While expressions such as "greater by $\Delta f01$" and "smaller by $\Delta f03$" are used herein for convenience, strictly speaking, differences between the actual (or assumed) flow rate and the ideal flow rate are evaluated in terms of values derived by subtracting the ideal flow rate from the actual (or assumed) flow rate.

Here, the case where the flow rate $S0=S0_1$, $S0_2$, $S0_3$ has been described. However, the actual flow rate fm0 versus the flow rate setting signal S0 are measured for between 10 and 20 values of the flow rate setting signal S0, for example. These flow rate measurements are then associated with the respective values of the flow rate setting signal S0, and saved as part of the calibration gas characteristic data DPm. The flow rate measurements saved as part of the calibration gas characteristic data DPm function as characteristic parameters representing characteristics of the flow rate control device.

Figure 9:
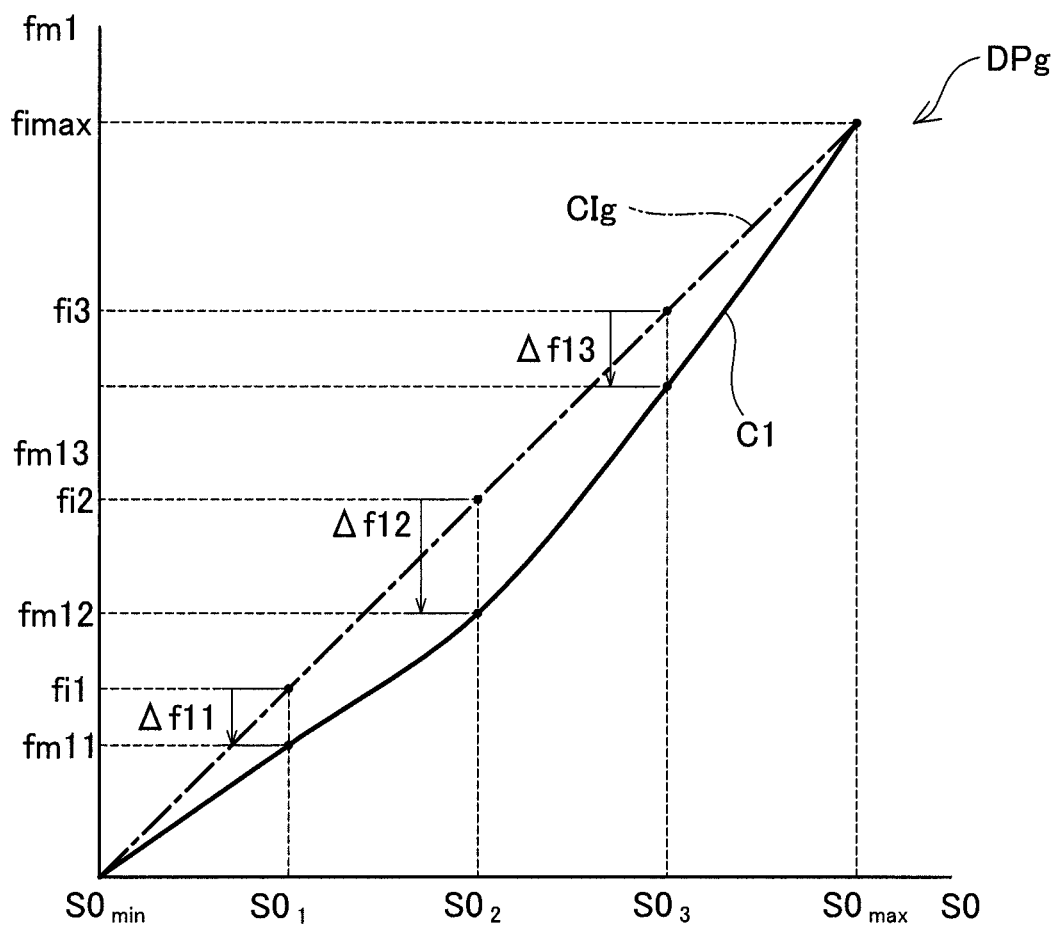
FIG. 9 is a graph representing actual gas characteristic data DPg.

FIG. 9 is a graph representing actual gas characteristic data DPg. The horizontal axis in FIG. 9 represents magnitude of the flow rate setting signal S0. The vertical axis represents actual measured flow rates of actual gas fm1 at each value of the flow rate setting signal S0. Here, the actual gas is sulfur hexafluoride ($SF_6$).

When deriving the actual gas characteristic data DPg shown in FIG. 9, a benchmark mass flow rate control device MFCi employing nitrogen gas ($N_2$) as the calibration gas and adjusted to ideal conditions is used in place of the mass flow rate control device MFC0 of the present mode of embodiment. Specifically, when the actual gas characteristic data DPg shown in FIG. 9 is derived, the correction module 181 of the mass flow rate control device MFCi outputs, as a corrected flow rate setting signal S0a, the flow rate setting signal S0 that has been corrected to an ideal condition in relation to nitrogen gas ($N_2$).

The gas circulated in the fluid passage 4 when the actual gas characteristic data DPg shown in FIG. 9 is obtained is sulfur hexafluoride ($SF_6$) by way of the actual gas. The flow rate of the gas circulated through the fluid passage 4 is measured by a flow rate measuring device installed downstream from the mass flow rate control device MFCi. Flow rate values are measured once control by the control circuit 180 has assumed a stable state.

In FIG. 9, the curve C1 is a graph representing actual gas characteristic data DPg in the benchmark mass flow rate control device MFCi. The straight line Clg, on the other hand, is a graph representing actual gas characteristic data in an ideal mass flow rate control device MFCig having ideal characteristics in relation to sulfur hexafluoride ($SF_6$) by way of the actual gas.

In the example of FIG. 9, when the flow rate setting signal S0 is $S0_1$ for example, the actual flow rate fm1 in the mass flow rate control device MFCi is a value fm11 smaller by $\Delta f11$ than an ideal value of fi1. When the flow rate setting signal S0 is $S0_2$, the actual flow rate fm1 is a value fm12 smaller by $\Delta f12$ than an ideal value of fi2. When the flow rate setting signal S0 is $S0_3$, the actual flow rate fm1 is a value smaller by $\Delta f13$ than an ideal value of fi3. When the flow rate setting signal S0 is $S0_{min}$ or $S0_{max}$, the actual flow rate fm1 is identical to the respective ideal values.

Here, a case where the flow rate S0 $S0_1$, $S0_2$, $S0_3$ has been described. However, the actual flow rate fm1 versus the flow rate setting signal S0 is measured for between 10 and 20 values of the flow rate setting signal S0, for example. The measured values of the flow rate setting signal S0 when the actual gas characteristic data DPg is obtained are in agreement with the measured values of the flow rate setting signal S0 when the calibration gas characteristic data DPm is obtained.

The above flow rate measurements are then associated with the respective values of the flow rate setting signal S0, and saved as part of the actual gas characteristic data DPg. The flow rate measurements saved as part of the actual gas characteristic data DPg function as characteristic parameters that represent the characteristics of the gas.

Figure 10:
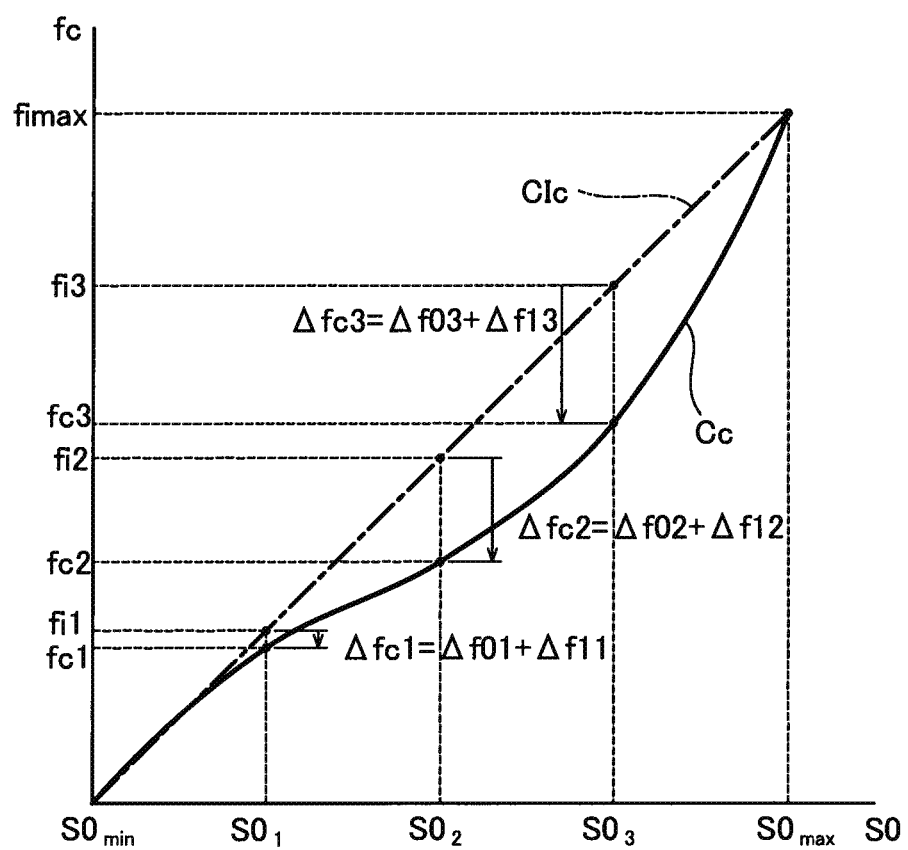
FIG. 10 is a graph representing characteristics of the mass flow rate control device MFC0 of the mode of embodiment, calculated on the basis of calibration gas characteristic data DPm and actual gas characteristic data DPg.

FIG. 10 is a graph representing characteristics of the mass flow rate control device MFC0 of the present mode of embodiment, calculated on the basis of calibration gas characteristic data DPm and actual gas characteristic data DPg. The horizontal axis in FIG. 10 represents magnitude of the flow rate setting signal S0. The vertical axis represents an expected flow rate fc of actual gas at each value of the flow rate setting signal S0.

In FIG. 10, curve Cc is a graph that represents expected flow rate fc in the mass flow rate control device MFC0 of the present mode of embodiment. The straight line Clc, on the other hand, is a graph that represents flow rate in the mass flow rate control device MFC0 of the present mode of embodiment, where correction to an ideal condition is assumed. The graph Cc of FIG. 10 is obtained through synthesis of the graph C0 of FIG. 8 and the graph C1 of FIG. 9.

In the example of FIG. 10, when the flow rate setting signal S0 is $S0_1$ for example, the expected flow rate fc in the mass flow rate control device MFC0 is fc1, which is smaller by $\Delta fc1$ than an ideal value of fi1. Here, $\Delta fc1=\Delta f01+\Delta f11$.

Similarly, when the flow rate setting signal S0 is $S0_2$, the expected flow rate fc in the mass flow rate control device MFC0 is fc2, which is smaller by $\Delta fc2$ than an ideal value of fi2. Here, $\Delta fc2=\Delta f02+\Delta f12$. The expected flow rate fc3 when the flow rate setting signal S0 is $S0_3$, and the expected flow rates fc at other values of the flow rate setting signal S0, can be obtained analogously on the basis of the level of discrepancy between the calibration gas characteristic data DPm and the actual gas characteristic data DPg. That is, the graph Cc of FIG. 10 has a level of discrepancy from ideal values equivalent to the sum of the level of discrepancy of the graph C0 of FIG. 8 from ideal values and the level of discrepancy of graph C1 of FIG. 9 from ideal values.

The mass flow rate control device MFC0 of the present mode of embodiment is assumed to have characteristics as shown by the graph Cc of FIG. 10. Thus, when the flow rate control device MFC0 of the present mode of embodiment is used for the actual gas sulfur hexafluoride ($SF_6$), correction should be carried out in such a way as to cancel out the discrepancy of the graph Cc of FIG. 10 from the Clc.

Figure 11:
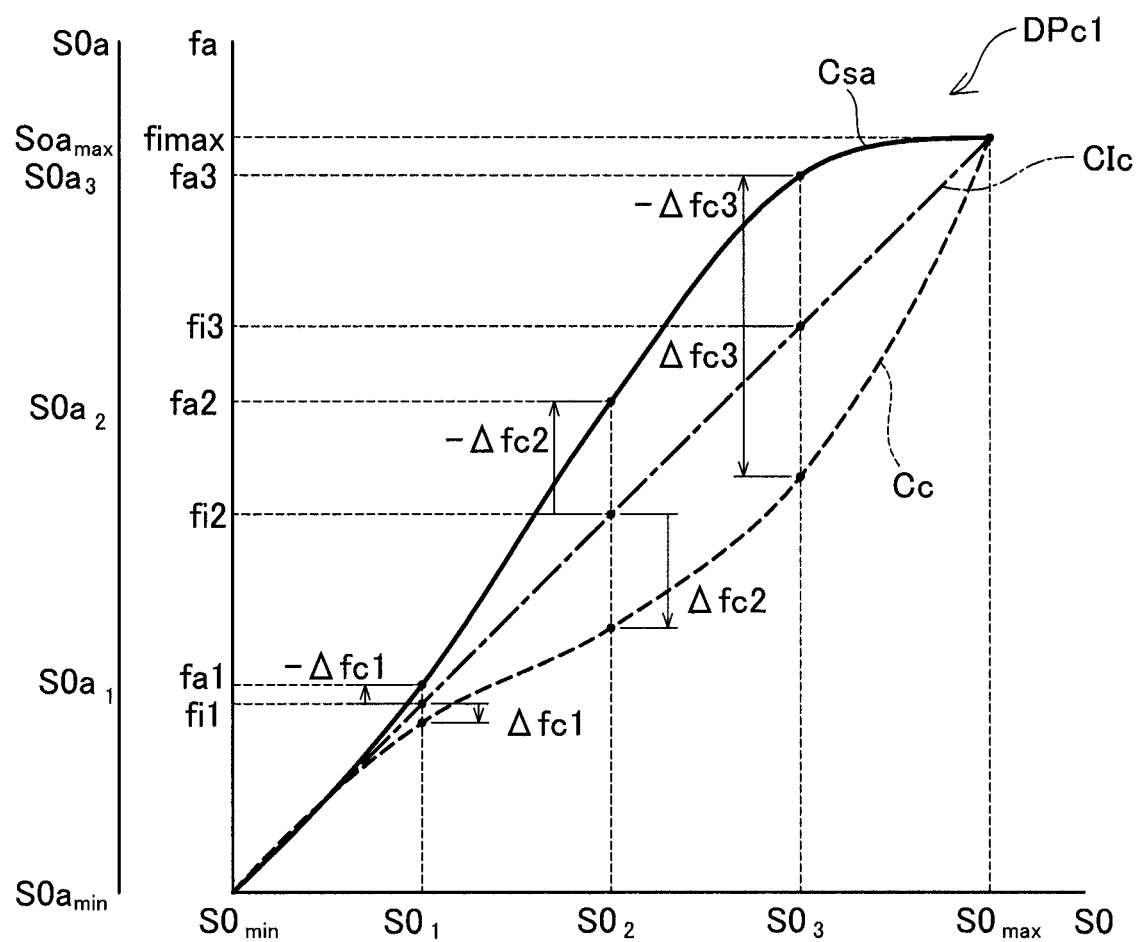
FIG. 11 is a graph representing characteristics of controlled flow rate correction data DPc1 (see FIG. 7)

FIG. 11 is a graph representing characteristics of controlled flow rate correction data DPc1 (see FIG. 7). The horizontal axis in FIG. 11 represents magnitude of the flow rate setting signal S0. The vertical axis represents corrected flow rate setting signal S0$a$ and expected flow rate fa of gas in the fluid passage 4 at that time, at each value of the flow rate setting signal S0.

In order to perform correction so as to eliminate discrepancy of the graph Cc from CIc in FIG. 10, an output signal S4$o$ that produces a greater flow rate should be output when a flow rate setting signal S0 of each value is presented.

More specifically, as depicted in FIG. 11, when the flow rate setting signal S0 is S0$_1$, a corrected flow rate setting signal S0$a_1$ that will produce a flow rate fa1 greater by Δfc1 than the ideal value fi1 is presented to the control circuit 180. When the flow rate setting signal S0 is S0$_2$, a corrected flow rate setting signal S0$a_2$ that will produce a flow rate fa2 greater by Δfc2 than the ideal value fi2 is presented to the control circuit 180. When the flow rate setting signal S0 is S0$_3$, a corrected flow rate setting signal S0$a_3$ that will produce a flow rate fa3 greater by Δfc3 than the ideal value fi3 is presented to the control circuit 180. The procedure is analogous for other values of the flow rate setting signal S0.

The transformation curve for transforming the flow rate setting signal S0 to the corrected flow rate setting signal S0$a$ while producing such characteristics is curve Csa shown in FIG. 11.

As noted, the difference between actual (or expected) flow rates and ideal flow rates is evaluated in terms of values derived by subtracting the ideal flow rate from the actual (or expected) flow rate. Thus, in FIG. 11, discrepancy levels adapted to produce larger flow rates are shown with minus signs (see −Δfc1, −Δfc2, −Δfc3 in FIG. 11). This is because expected flow rates are smaller than the ideal flow rates, and the discrepancy levels (Δfc1, Δfc2, Δfc3) of the expected flow rates from the ideal flow rates are negative values.

As mentioned earlier, flow rates of the calibration gas characteristic data DPm and the actual gas characteristic data DPg are measured for between 10 and 20 values of the flow rate setting signal S0. Thus, the number of corrected flow rate setting signals S0$a$ calculated on the basis of these measured values will be equal to a number corresponding to these measured flow rate setting signals S0. Hereinbelow, values of the flow rate setting signal S0 for which the corresponding flow rates were measured during generation of the calibration gas characteristic data DPm and the actual gas characteristic data DPg will sometimes be denoted as "S0$r$." Corrected flow rate setting signals S0$a$ corresponding to flow rate setting signals S0$r$ calculated on the basis of flow rates measured in this way will sometimes be denoted as "reference corrected flow rate setting signals S0$ar$."

When using the curve Csa of FIG. 11 to convert the flow rate setting signal S0 to the corrected flow rate setting signal S0$a$, for a corrected flow rate setting signal S0$a$ (hereinafter denoted as "S0$ac$") that corresponds to a value of the flow rate setting signal S0 (hereinafter denoted as "S0$c$") for which flow rate was not measured during generation of the calibration gas characteristic data DPm and the actual gas characteristic data DPg, a process such as the following is carried out. Specifically, a corrected flow rate setting signal S0$ac$ corresponding to such a flow rate setting signal S0$c$ value is determined on the basis of a plurality of reference corrected flow rate setting signals S0$ar$ that correspond to a plurality of flow rate setting signals S0$r$ having values approximating those flow rate setting signals S0$c$ (e.g., through interpolation operations using these values).

As discussed above, the correction module 181 refers to the controlled flow rate correction data DPc1 and replaces the flow rate setting signal S0 with the corrected flow rate setting signal S0$a$. The controlled flow rate correction data DPc1 is data adapted to effect a transformation having characteristics as shown by the curve Csa in FIG. 11. Specifically, the control unit 18 refers to the controlled flow rate correction data DPc1, and using the corrected flow rate setting signals S0$a$ (S0$ar$ and S0$ac$) as control parameters, controls the control valve 27 via the valve actuation circuit 28.

According to this mode, the mass flow rate control device MFC0 of the present mode of embodiment can be constituted as a mass flow rate control device that affords highly accurate flow rate control in relation to an actual gas (here, sulfur hexafluoride ($SF_6$)).

(2) Implementation of the Mass Flow Rate Control Device for Various Gases:

In preferred practice, actual gas characteristic data DPg is acquired for various different gases (e.g. Ar and $Cl_2$). By generating controlled flow rate correction data DPc1 on the basis of calibration gas characteristic data DPm and actual gas characteristic data DPg acquired in this way, it is possible for the mass flow rate control device MFC0 to be implemented for various actual gases. Highly accurate control in relation to these various cases can then be accomplished using the mass flow rate control device MFC0.

Actual gas characteristic data DPg prepared for various actual gases is recorded onto a swappable recording medium such as CD-ROM. Thus, the mass flow rate control device MFC0 can be implemented for various actual gases by swapping the recording medium on which the actual gas characteristic data DPg is stored. That is, there is no need for a massive amount of actual gas characteristic data DPg for the various different types of actual gas to be stored in the fixed memory that has been provided to the mass flow rate control device MFC0. In other words, it is not be necessary to provide the mass flow rate control device MFC0 with a large-capacity storage for the purpose of storing actual gas characteristic data DPg for the various different types of actual gas.

(3) Implementation of the Mass Flow Rate Control Device for Various Flow Rate Ranges:

Actual gas characteristic data DPg can be generated for flow rate ranges that correspond to some of the flow rate ranges of the calibration gas characteristic data DPm. Actual gas characteristic data DPg can then be generated for various mutually different flow rate ranges (see FIG. 6 for example). In such a case, a possible mode would be one such as the following.

Specifically, during generation of the calibration gas characteristic data DPm, flow rates are measured for values of the flow rate setting signal S0 at sufficient narrow intervals, e.g. 1% intervals, 2% intervals, or 4% intervals. On the other hand, during generation of the actual gas characteristic data DPg, flow rates may be measured for at least some values of the flow rate setting signal S0 included in a flow rate range that corresponds to part of the flow rate range of the calibration gas characteristic data DPm, and for which flow rates were measured during generation of calibration gas data DPm.

Generation of actual gas characteristic data DPg can be carried out through a mode such as the following. Specifically, during generation of the actual gas characteristic data DPg as well, flow rate measurements are obtained for the same values of the flow rate setting signal S0 as during generation of the calibration gas characteristic data DPm. Some flow rate measurements included in each flow rate range can then be selected from among these measurements, and actual gas characteristic data DPg generated for each flow rate range.

By generating controlled flow rate correction data DPc1 on the basis of actual gas characteristic data DPg and calibration gas characteristic data DPm acquired in this way, controlled flow rate correction data DPc1 appropriate for different flow rate ranges can be generated. As a result, the mass flow rate control device MFC0 can be implemented in relation to different flow rate ranges, through the use of controlled flow rate correction data DPc1 that has been adapted to the different flow rate ranges. Using the mass flow rate control device MFC0, highly accurate control can be accomplished for the different flow rate ranges.

In this mode, the calibration gas characteristic data DPm has flow rate values for a larger number of values of the flow rate setting signal S0 than does each set of actual gas characteristic data DPg. However, as mentioned above, the actual gas characteristic data DPg is recorded onto swappable recording media, and is not stored in the fixed storage provided in the mass flow rate control device MFC0. Thus, despite the fact that the calibration gas characteristic data DPm which is stored in the fixed storage section provided in the mass flow rate control device MFC0 has values for a larger number of values of the flow rate setting signal S0 than does each set of actual gas characteristic data DPg, the storage section provided in the mass flow rate control device MFC0 has smaller capacity, as compared to a mode in which the actual gas characteristic data DPg is stored in the fixed storage section provided in the mass flow rate control device MFC0.

A4. Effects of First Mode of Embodiment:

According to the first mode of embodiment described above, in a system such as a semiconductor production system, the actual process gases can be controlled with high accuracy using a single mass flow rate control device, even where several different types of actual process gases are used.

B. Second Mode of Embodiment:

In the first mode of embodiment, S0a is generated by tacking on beforehand expected discrepancy that is assumed to occur when the mass flow rate control device MFC0 receives the flow rate setting signal S0 (see FIG. 11). In a second mode of embodiment on the other hand, when the mass flow rate control device MFC0 receives the flow rate setting signal S0, a corrected flow rate setting signal S0a adapted to produce a target flow rate represented by the flow rate setting signal S0 will be generated. In the second mode of embodiment, the content of the controlled flow rate correction data DPc1r, which corresponds to the controlled flow rate correction data DPc1 of the first mode of embodiment, differs from that in the first mode of embodiment. In other respects, second mode of embodiment is the same as first mode of embodiment.

Figure 12:
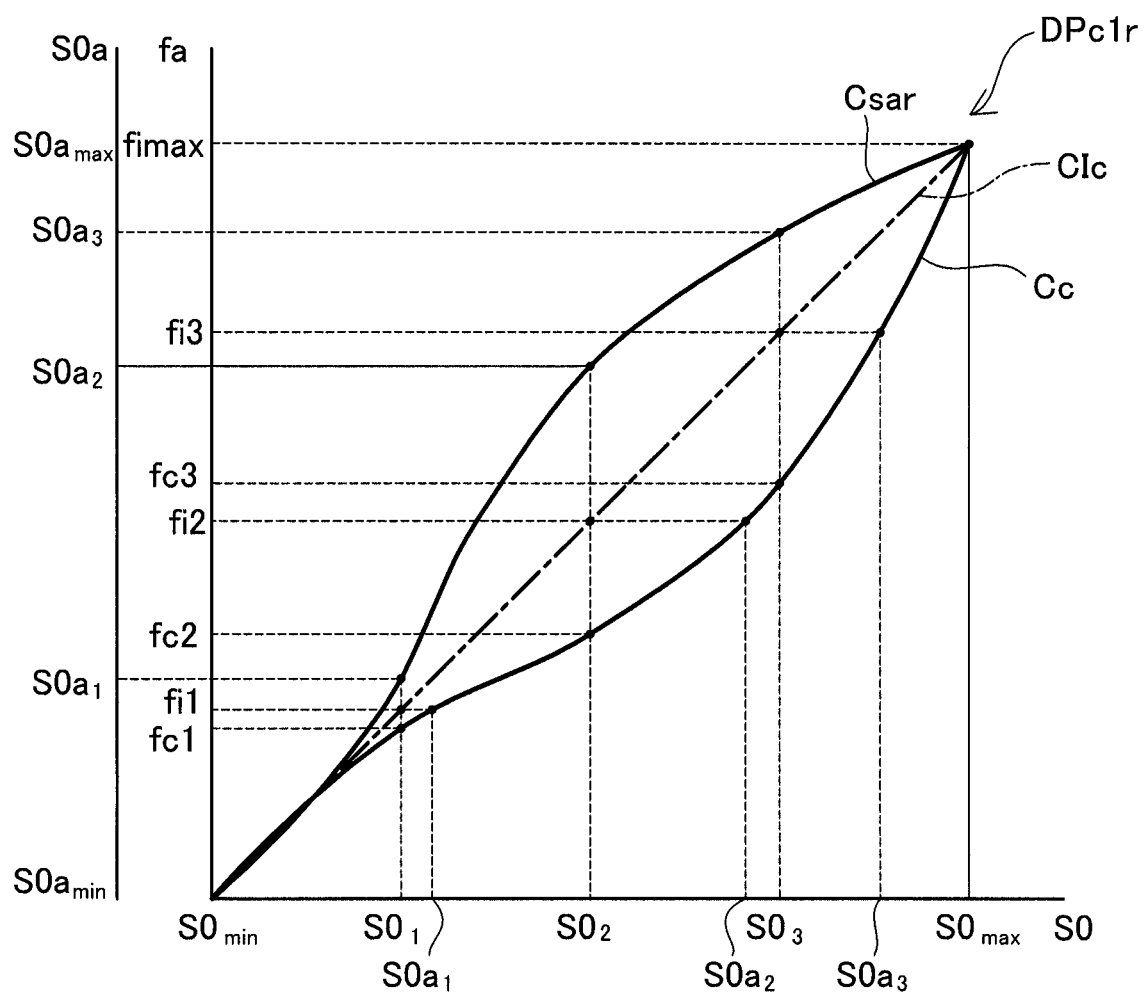
FIG. 12 is a graph representing characteristics of controlled flow rate correction data DPc1r in a second mode of embodiment.

FIG. 12 is a graph representing characteristics of controlled flow rate correction data DPc1r (see the controlled flow rate correction data DPc1 of FIG. 7) in the second mode of embodiment. The vertical axis represents flow rate fa of gas in the fluid passage 4 at each value of the flow rate setting signal S0, and the corrected flow rate setting signal S0a corresponding to the flow rate setting signal S0.

The curve Cc and the straight line Clc in FIG. 12 are identical respectively to the curve Cc and the line Clc of FIG. 10. That is, the curve Cc is a graph representing the flow rate of actual gas in the mass flow rate control device MFC0 of the present mode of embodiment. The straight line Clc, on the other hand, is a graph that represents flow rate in the mass flow rate control device MFC0 of the present mode of embodiment, where corrected to an ideal condition for the actual gas is assumed.

For example, in the event that the mass flow rate control device MFC0 has received the flow rate setting signal $S0_2$, according to the straight line Clc, the target flow rate for the flow rate setting signal $S0_2$ is fi2. However, according to the graph Cc, the expected flow rate in the mass flow rate control device MFC0 will be fc2, which is less than fi2 (see the vertical axis in FIG. 12). Thus, in order to actually circulate an actual gas at the target flow rate fi2 (see the vertical axis in FIG. 12), according to the graph Cc, it is necessary to input $S0a_2$ as the flow rate setting signal to the control circuit 180 (see the horizontal axis in FIG. 12). Similarly, in order to actually circulate an actual gas at the target flow rate fi3 represented by the flow rate setting signal $S0_3$ (see the vertical axis in FIG. 12), according to the graph Cc, it is necessary to input $S0a_3$ as the flow rate setting signal to the control circuit 180 (see the horizontal axis in FIG. 12). The procedure is analogous for the flow rate setting signal $S0_1$ and other values of the flow rate setting signal S0.

The transformation curve for transforming the flow rate setting signal S0 to the corrected flow rate setting signal S0a while producing such characteristics is the curve Csar shown in FIG. 12. By carrying out transformation in accordance with the curve Csar, the flow rate setting signal $S0_2$ is be transformed to the corrected flow rate setting signal $S0a_2$, and the flow rate setting signal $S0_3$ is be transformed to the corrected flow rate setting signal $S0a_3$. The procedure is analogous for other flow rate setting signals S0 as well.

Specifically, the control unit 18 refers to the controlled flow rate correction data DPc1, and using the corrected flow rate setting signal S0a as the control parameter, controls the control valve 27 via the valve actuation circuit 28.

A corrected flow rate signal S1a corresponding to a value of the flow rate setting signal S0c for which flow rate was not measured during generation of the calibration gas characteristic data DPm and the actual gas characteristic data DPg is determined on the basis of a plurality of reference corrected flow rate setting signals S0ar that correspond to a plurality of flow rate setting signals S0r having values approximating those flow rate setting signals S0c (e.g., through interpolation operations using these values).

In the second mode of embodiment, the correction module 181 refers to the controlled flow rate correction data DPc1r and replace the flow rate setting signal S0 with the corrected flow rate setting signal S0a (see FIG. 7). The controlled flow rate correction data DPc1r is data adapted to effect a transformation having characteristics as shown by the curve Csar of FIG. 12. According to this mode, the mass flow rate control device MFC0 of the present mode of embodiment can be constituted as a mass flow rate control device that affords higher accuracy of flow rate control than does the first mode of embodiment in relation to an actual gas (here, sulfur hexafluoride ($SF_6$)).

C. Third Mode of Embodiment:

In the first and second modes of embodiment, error in flow rate control by the mass flow rate control device MFC is reduced by replacing the flow rate setting signal S0 with the corrected flow rate setting signal S0a. In contrast, in a third mode of embodiment, error in flow rate control by the mass flow rate control device MFC is reduced by replacing the flow rate signal S1 output from the flow rate sensor 8 with the corrected flow rate signal S1a. The internal configuration of the control unit means 18 in the third mode of embodiment is different from that in the first mode of embodiment. In other respects, the third mode of embodiment is the same as the first mode of embodiment.

Figure 13:
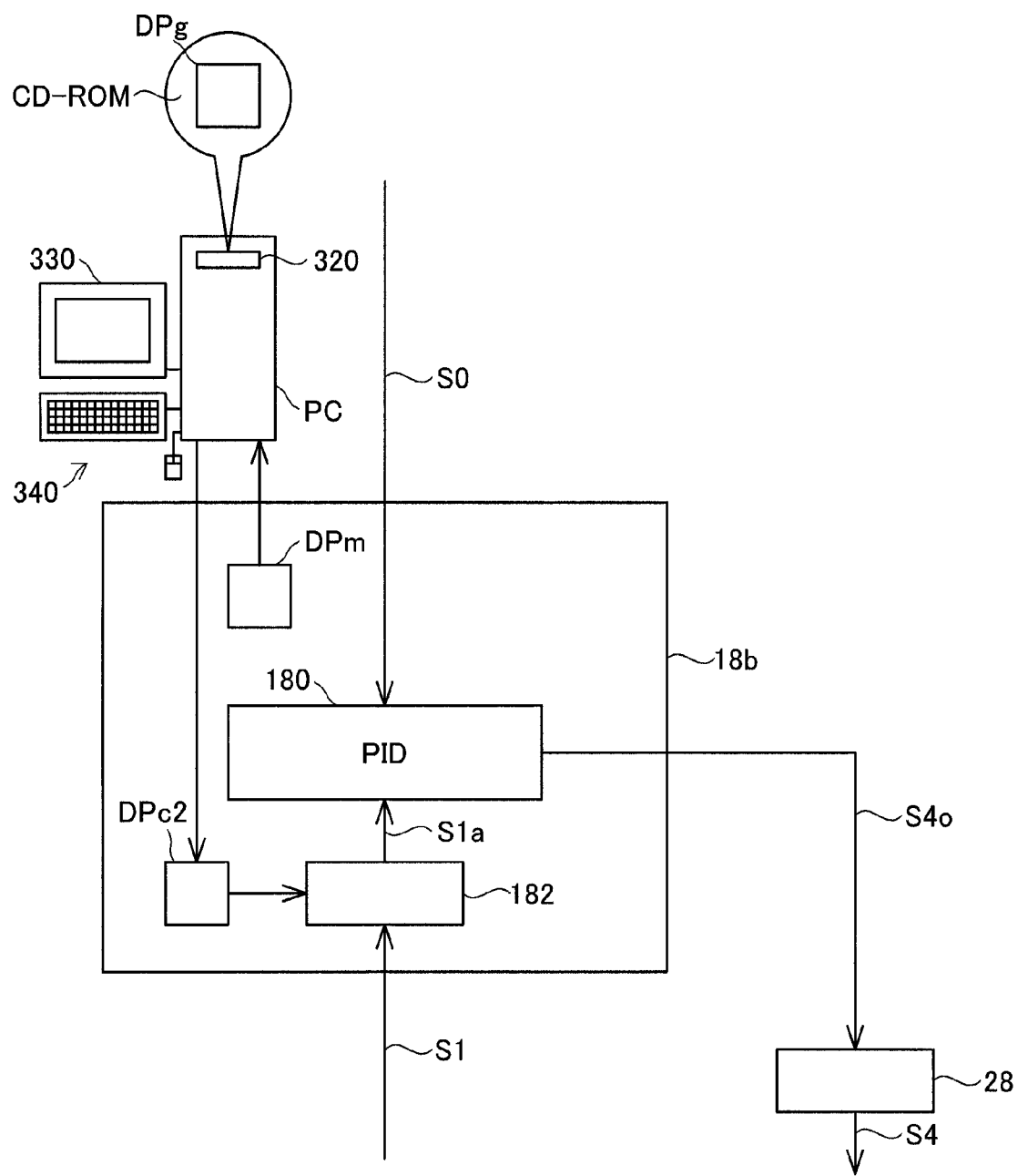
FIG. 13 is a block diagram depicting fine configuration by control unit 18 in a third mode of embodiment.

FIG. 13 is a block diagram depicting in detail the configuration of the control unit 18 in the third mode of embodiment. The control unit 18 is provided with a control circuit 180 and a correction module 182. The control unit 18 stores in its memory the calibration gas characteristic data DPm and controlled flow rate correction data DPc2. Like the controlled flow rate correction data DPc1 in First mode of embodiment, the controlled flow rate correction data DPc2 is generated by the personal computer PC on the basis of the calibration gas characteristic data DPm and the actual gas characteristic data DPg.

While referring to the controlled flow rate correction data DPc2, the correction module 182 modifies the sensor output signal S1 that is input from the flow rate sensor circuit 16, to the corrected flow rate signal S1$a$. The corrected flow rate signal S1$a$ is a signal generated through modification of the sensor output signal S1, so as to represent a flow rate that more closely approximates the actual flow rate of actual gas circulated through the fluid passage 4, than does the sensor output signal S1 output by the flow rate sensor circuit 16.

The control circuit 180 outputs an output signal S4$o$ such that the flow rate setting signal S0 representing the target flow rate and the corrected flow rate signal S1$a$ representing measured flow rate are in agreement. Specifically, the control circuit 180 controls the flow rate of gas through the fluid passage 4.

Figure 14:
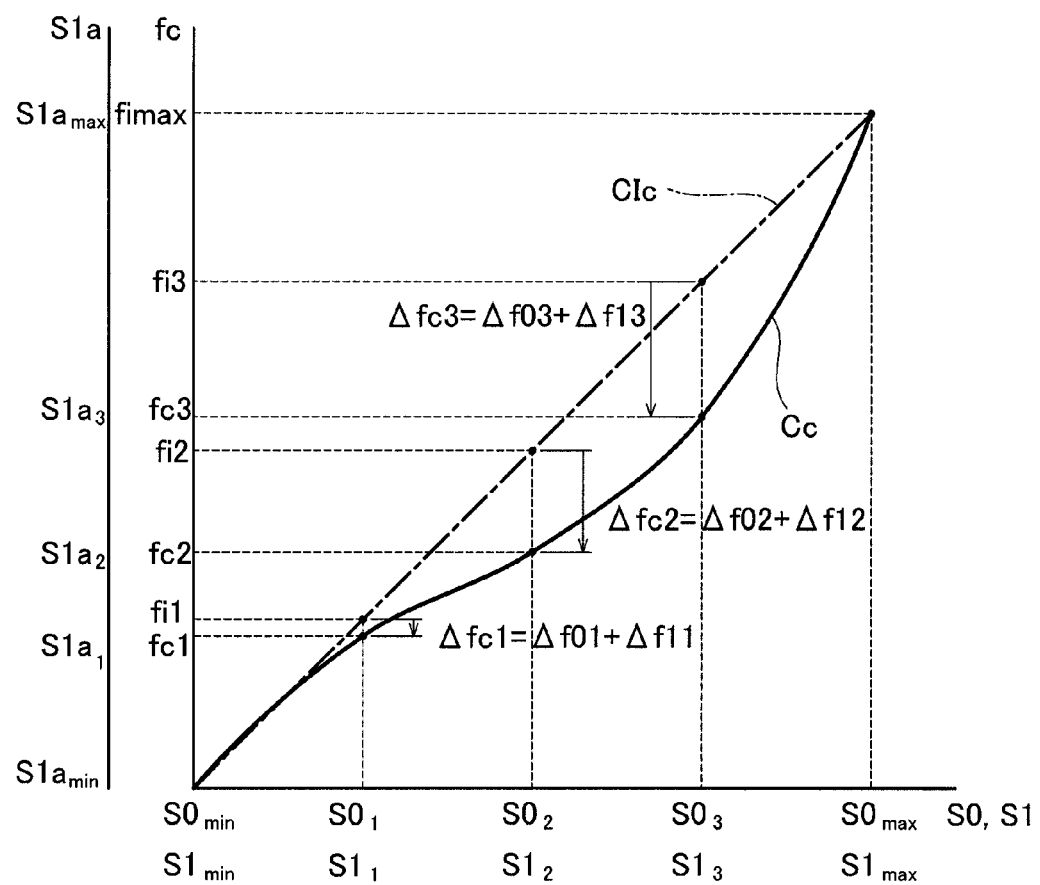
FIG. 14 is a graph representing characteristics of controlled flow rate correction data DPc2 in the third mode of embodiment.

FIG. 14 is a graph representing characteristics of the controlled flow rate correction data DPc2 in the third mode of embodiment. The horizontal axis in FIG. 14 represents magnitude of the flow rate setting signal S0 and of the flow rate signal S1 in the event that correction is not performed. The vertical axis represents the flow rate fc of gas inside the fluid passage 4 at each value of the flow rate signal S1 in the absence of correction, and the corrected flow rate signal S1$a$ corresponding to the flow rate signal S1.

The curve Cc and the straight line Clc in FIG. 14 are identical respectively to the curve Cc and the line Clc of FIG. 10. That is, the curve Cc is a graph representing the expected flow rate of actual gas, in the absence of correction, in the mass flow rate control device MFC0 of the present mode of embodiment. The straight line Clc, on the other hand, is a graph that represents flow rate in the mass flow rate control device MFC0 of the present mode of embodiment, where corrected to an ideal condition for the actual gas is assumed.

As mentioned earlier, measurements of the calibration gas characteristic data DPm and the actual gas characteristic data DPg respectively are made after control by the control circuit 180 has assumed a stable state, that is, after the difference between the flow rate setting signal S0 and the sensor output signal S1 is equal to or less than a prescribed value. Thus, measurements for values of the flow rate setting signal S0 (during measurement, correction by controlled flow rate correction data is not performed) can be regarded as equivalent to measurements for values of the sensor output signal S1.

Where correction is not performed, when a sensor output signal S1$_2$ is output by the flow rate sensor 8, from the curve Cc, the actual flow rate of actual gas is expected to be fc2, rather than fi2 (see the vertical axis of FIG. 14).

Thus, where the correction module 182 of the third mode of embodiment performs correction, when the sensor output signal S1$_2$ is output by the flow rate sensor 8, a corrected flow rate signal S1$a_2$ should be output to the control circuit 180 (see the vertical axis of FIG. 14).

Here, a "signal S$_x$ corresponding to a flow rate fx" refers to a signal S$_x$ determined such that the ratio of the flow rate fx to the maximum flow rate is equal to the ratio of the signal S$_x$ to the maximum value S$_{max}$ of the signal.

Similarly, where correction is not performed, when a sensor output signal S1$_3$ is output by the flow rate sensor 8, the actual flow rate of actual gas is fc3, rather than fi3 (see the vertical axis of FIG. 14).

Accordingly, where the correction module 182 of the third mode of embodiment performs correction, when a sensor output signal S1$_3$ is output by the flow rate sensor 8, a corrected flow rate signal S1$a_3$ corresponding to the flow rate fc3 should be output to the control circuit 180 (see the vertical axis of FIG. 14). The procedure is analogous for the sensor output signal S1$_1$ and the other sensor output signals S1.

Where the horizontal axis of the graph of FIG. 14 is regarded as the magnitude of the flow rate signal S1, and the vertical axis is regarded as the corrected flow rate signal S1$a$ corresponding to each value of the flow rate signal S1, it will be appreciated that the curve Cc of FIG. 14 has the function of a transformation curve for transforming the sensor output signal S1 to the corrected flow rate signal S1$a$, while producing characteristics such as those described above.

In the third mode of embodiment, the correction module 182 refers to the controlled flow rate correction data DPc2 and replaces the sensor output signal S1 with the corrected flow rate signal S1$a$ (see FIG. 13). The controlled flow rate correction data DPc2 is data adapted to effect a transformation having characteristics as shown by the curve Cc in FIG. 14. Specifically, the control unit 18 refers to the controlled flow rate correction data DPc2, and using the corrected flow rate signal S1$a$ as the control parameter, controls the control valve 27 via the valve actuation circuit 28.

A corrected flow rate signal S1$a$ corresponding to a value of the flow rate setting signal S0$c$ (value of the sensor output signal S1) for which flow rate was not measured during generation of the calibration gas characteristic data DPm and the actual gas characteristic data DPg can be determined as follows. Specifically, a corrected flow rate signal S1$ac$ corresponding to such a value of the flow rate setting signal S0$c$ is determined on the basis of a plurality of reference corrected flow rate setting signals S0$ar$ that correspond to a plurality of flow rate setting signals S0$r$ having values approximating those flow rate setting signals S0$c$ (e.g., through interpolation operations using these values).

With this mode as well, the mass flow rate control device MFC0 in the present mode of embodiment can be constituted as a mass flow rate control device that affords high accuracy of flow rate control in relation to an actual gas (here, sulfur hexafluoride (SF$_6$)).

Figure 15:
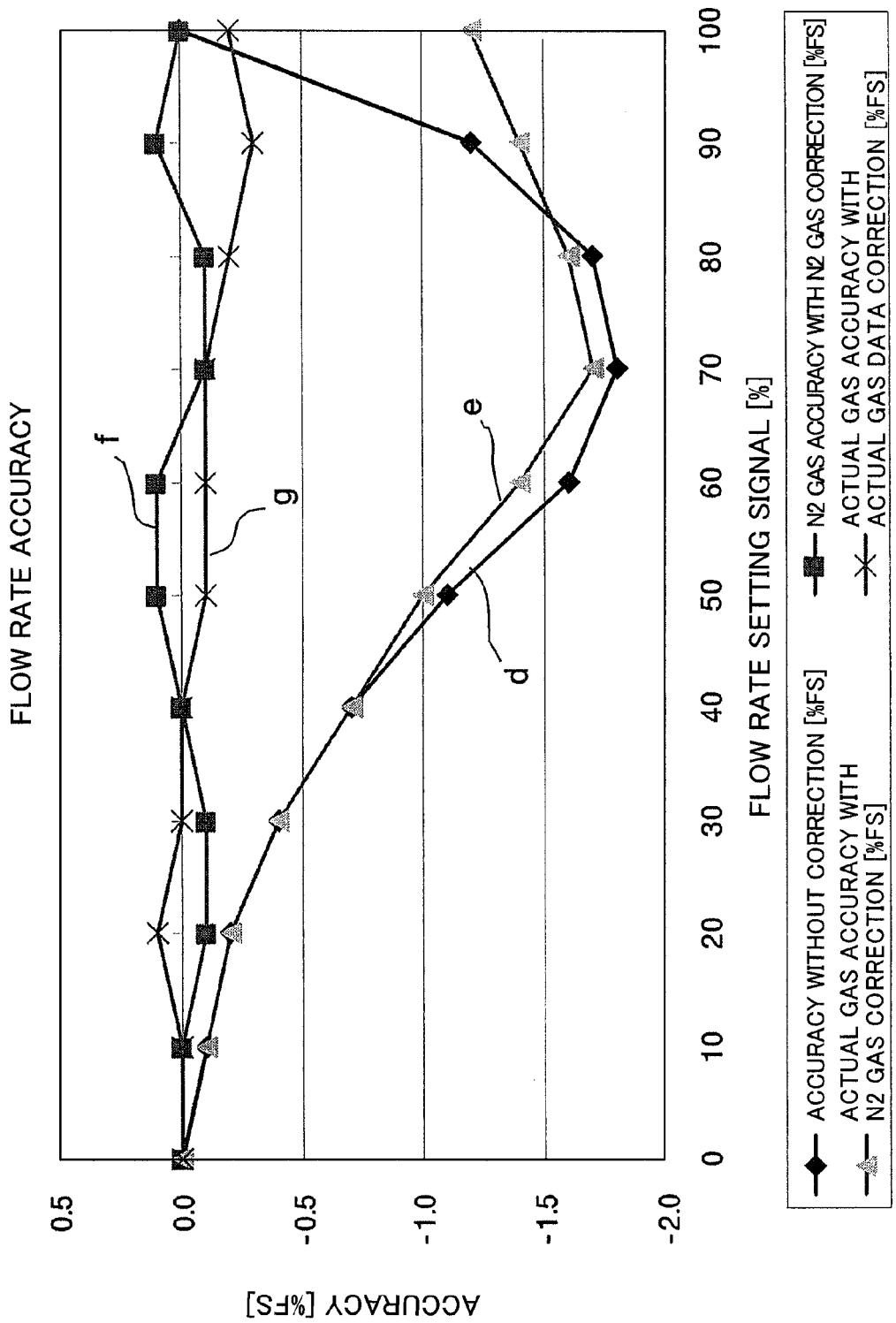
FIG. 15 is a characteristic line diagram depicting an embodiment of the present invention, and showing control accuracy with respect to full scale flow rate.

D. Embodiment:

FIG. 15 depicts control accuracy with respect to a prescribed (arbitrary) full scale flow rate, where correction has been performed according to the first mode of embodiment of the present invention, and where it has not. The horizontal axis is a percentage versus a 5 V flow rate setting signal S0. In the example of FIG. 15, at 100%, i.e. when S0 is 5 V, the target flow rate is 200 [ccm]. The vertical axis of FIG. 15 is % Full Scale. That is, the vertical axis of FIG. 15 indicates deviation of measured flow rate from target flow rate, as a percentage of the full scale of 200 [ccm].

Graph d of FIG. 15 represents accuracy where nitrogen (N$_2$) is circulated without any correction whatsoever. Graph e represents accuracy where actual gas is circulated, while performing correction of flow rate control using calibration gas characteristic data obtained with N$_2$ gas. Graph f represents accuracy where N$_2$ gas is circulated, while performing correction of flow rate control using calibration gas characteristic data obtained with N$_2$ gas. Graph g represents accuracy where actual gas is circulated, while performing correction of flow rate control using the controlled flow rate correction data of the preceding modes of embodiment.

From FIG. 15, it is appreciated that flow rate accuracy observed in the without any correction whatsoever contains error of on the order of 2% FS at most (see graph d). Despite using a flow rate with these characteristics, i.e. an identical flow rate sensor, where correction is next carried out using calibration gas characteristic data obtained with N$_2$ gas, flow rate accuracy where $N_2$ gas is circulated is 0.1% FS (see graph f). However, where an actual process gas is circulated (e.g. $SF_6$), error on the order of 2% FS at most occurs (see graph e). According to the modes of embodiment discussed above, on the other hand, it is appreciated that flow rate accuracy is at most about 0.5% FS (see graph g).

A thermal type flow rate sensor is used as the flow rate sensor of the mass flow controller of the modes of the embodiment discussed above. However, the present invention can also be reduced to practice using a pressure type flow rate sensor designed to calculate, with added corrections, the flow rate of a gas flowing through the orifice, with the pressure P1 of the gas at the orifice upstream portion and the pressure P2 of the gas at the orifice downstream portion held at critical condition (sonic range). That is, the present invention can be reduced to practice irrespective of the format of the flow rate sensor.

According to the mass flow controller described above, even if the mass flow controller has been adjusted with a calibration gas, it is possible for the mass flow controller to be respecified to a plurality of different types of actual process gases and a plurality of different flow rate ranges after the unit has been shipped.

E. Modified Embodiments:

The invention is not limited to the modes of embodiment described hereinabove, and may be reduced to practice in various other modes without departing from the spirit of the invention.

E1. Modified Embodiment 1:

In the preceding modes of embodiment, the controlled flow rate correction data DPc is generated by a personal computer on the basis of the calibration gas characteristic data DPm and the actual gas characteristic data DPg. However, in another possible mode, the mass flow rate control device MFC0 can be provided as a constituent element with a processing module for generating the controlled flow rate correction data DPc.

E2. Modified Embodiment 2:

In the preceding embodiment, the device for measuring flow rate in the fluid passage 4 during generation of calibration gas characteristic data DPm and actual gas characteristic data DPg is a device furnished externally to the mass flow rate control device MFC0. One example of such a flow rate measuring device is a tank connected downstream from the mass flow rate control device MFC0, the tank being adapted to accept gas circulated from the mass flow rate control device MFC0 under high vacuum conditions (see FIG. 1). Specifically, first, during the process of acquiring characteristic data, the tank T is placed under a vacuum such that it is able to sufficiently accept gas fed from the mass flow rate control device MFC0, and subsequently accepts gas circulated from the mass flow rate control device MFC0. By measuring the pressure change in the tank T with a pressure gauge M, the amount of gas circulated by the mass flow rate control device MFC0 can be measured.

On the other hand, the mass flow rate control device MFC0 may be furnished with a flow rate measuring device of some other design, namely, a flow rate measuring device provided separately from the flow rate sensor 8, and used during generation of the calibration gas characteristic data DPm and the actual gas characteristic data DPg.

Specifically, the flow rate measuring device used during generation of the calibration gas characteristic data DPm and the actual gas characteristic data DPg can be any flow rate measuring device that is provided separately from the flow rate sensor 8. In preferred practice, however, the flow rate measuring device has higher accuracy than the flow rate sensor 8.

E3. Modified Embodiment 3:

In the preceding modes of embodiment, the mass flow rate control device MFC0 controls the flow rate of gas flowing through the fluid passage 4 using a flow rate control valve mechanism 10 composed of a metal diaphragm 22 and an actuator 26. However, the device for controlling the flow rate of gas flowing through the fluid passage 4 could be a device that operates on some other principle instead. However, devices that control volumetric flow rate of gas through a physical mechanism can be easily procured for use as devices for controlling the flow rate of gas flowing through the fluid passage 4. "Volumetric flow rate" refers to the volume of fluid per unit time.

E4. Modified Embodiment 4:

In the preceding modes of embodiment, the calibration gas used when deriving the calibration gas characteristic data Dpm is nitrogen. However, the calibration gas could instead be some other gas, such as argon or sulfur hexafluoride. However, in preferred practice the calibration gas is a gas that is physically and chemically stable.

E5. Modified Embodiment 5:

In the preceding modes of embodiment, the calibration gas characteristic data Dpm is saved to semiconductor memory provided to the control unit 18, while the actual gas characteristic data DPg is saved to CD-ROM. However, both the calibration gas characteristic data Dpm and the actual gas characteristic data DPg can be saved to any storage device, such as a DVD, hard disk, or flash memory. However, the calibration gas characteristic data Dpm may preferably be saved to fixed memory provided to the flow rate control device. The actual gas characteristic data DPg may preferably be saved to a storage device that is easier to swap or update than is the storage device on which the calibration gas characteristic data Dpm has been saved. A mode whereby updating of actual gas characteristic data DPg is performed by the control unit of the flow rate control device would be possible, as would be a mode whereby it is performed by another device external to the flow rate control device.

E6. Modified Embodiment 6:

In the preceding modes of embodiment, the control circuit 180 performs PID control inclusive of the proportional, integral, and derivative terms. However, a mode whereby the control circuit 180 performs some other control, such as PI control inclusive of the proportional term and the integral term, would also be possible. In preferred practice, however, flow rate control may be accomplished through feedback control based on target values and measured values. The present invention is especially efficacious for implementation in instances where a physical quantity (e.g. mass flow rate) to which target values and measured values correspond differs from a physical quantity (e.g. volumetric flow rate) to which control values correspond.

E7. Modified Embodiment 7:

In the preceding embodiment, of the control parameters of the controlled flow rate correction data, those values that cannot be derived through operations based on flow rates actually measured during generation of the calibration gas characteristic data Dpm and the actual gas characteristic data DPg are derived through interpolation operations. However, these values could be derived by some other method.

For example, the curves representing the characteristics of the controlled flow rate correction data (see Csa in FIG. 11, Csar in FIG. 12, and Cc in FIG. 14) can be calculated as Bezier curves or spline curves, and those values that cannot be derived can be derived from measured values thereof. Even where interpolation operations are employed, various different interpolation operations can be used. These operations may be performed while carrying out control of the actual gas. In an alternative mode, operations may be carried out beforehand prior to carrying out control of the actual gas, and the values resulting from the operations saved to a prescribed storage device.

That is, of the control parameters of the controlled flow rate correction data, those values that cannot be derived through operations based on flow rates actually measured during generation of the calibration gas characteristic data Dpm and the actual gas characteristic data DPg can be determined through various methods, on the basis of values that can be derived through operations based on measured flow rates.

E8. Modified Embodiment 8:

In the preceding modes of embodiment, some of the elements that were implemented through hardware could instead be implemented through software, and conversely some of the elements that were implemented through software could instead be implemented through hardware. For example, the functions of the control unit 18 (see FIG. 1) could be implemented through hardware circuits, or accomplished through application software or a driver on the CPU. It would also be possible for some of the functions of the control unit 18 to be accomplished through hardware circuits, while other functions are accomplished through application software etc. on the CPU.

A computer program for accomplishing such functions could be provided in a form recorded onto a computer-readable storage medium such as a floppy disk, CD-ROM, or DVD. A host computer may load the computer program from the storage medium and may transfer it to an internal storage device or external storage device. Alternatively, the computer program could be provided to the host computer from a program provider device via a communications pathway. When carrying out the functions of the computer program, the computer program which has been saved to an internal storage device may be executed by the microprocessor of the host computer. Alternatively, the computer program which has been saved to a recording medium could be executed directly by the host computer.

The term computer as used herein signifies a concept inclusive of hardware devices and an operating system, and refers to hardware devices operated under the control of the operating system. The computer program, through the agency of the computer, may accomplish the functions of the various sections mentioned above. Some of the aforementioned functions could be carried out by the operating system, rather than by the application program.

In the present invention, the "computer-readable storage medium" is not limited to storage media of portable type such as a flexible disk, CD-ROM, or DVD, and is used to include also computer internal storage devices such as various types of RAM and ROM, as well as external storage devices fixed in the computer, such as a hard disk.

The computer program product can be realized in various modes. Possible modes include the following, for example.

(i) Computer-readable storage media. For example, flexible disks, optical disks, or semiconductor memory.
(ii) A data signal including a computer program and carried in a carrier wave.
(iii) A computer that includes a computer-readable storage media such as a magnetic disk or semiconductor memory.
(iv) A computer that temporarily stores a computer program in memory via a data carrier wave.

The present invention has been shown hereinabove through certain preferred modes of embodiment by way of example. However, the invention is not limited to the modes of embodiment or configurations described above. While the various elements of the invention disclosed herein have been shown in various different combinations and configurations, these are merely exemplary, and more or fewer elements may be used. A single element would also be acceptable. Such modes falls within the scope of the present invention.

Industrial Applicability

The present invention is applicable inter alia to a mass flow rate control device, a method of correction of a mass flow rate control device, or a method of correction in mass flow rate control.

The invention claimed is:

1. A method for controlling flow rate of a gas flowing on a flow path, comprising the steps of:
   (a) providing a flow rate control device configured to perform feedback control of a gas flow rate for a gas flowing on a flow path based on a target flow rate and a sensed flow rate, wherein the target flow rate is a target value for an intended mass flow rate of the gas flowing on the flow path wherein the sensed flow rate is a sensed mass flow rate of gas flowing on the flow path;
   (b) providing control data that includes a plurality of control parameters respectively associated with mutually different mass flow rates wherein the control data is associated with a type of the gas flowing on the flow path, and
   said providing of the control data comprising the steps of:
   (b1) providing first characteristic data that includes a plurality of first characteristic parameters associated with flow characteristics of a standard gas through the flow rate control device, wherein the first characteristic parameters are associated with mutually different mass flow rates for the standard gas through the provided flow rate control device, wherein the first characteristic parameters reflect differences of flow rates of the standard gas in the flow rate control device and flow rates of the standard gas in a benchmark flow rate control device, wherein the first characteristic data is saved to a first storage unit of the flow rate control device;
   (b2) providing second characteristic data that includes a plurality of second characteristic parameters associated with flow characteristics of an actual gas through a benchmark flow rate control device, wherein the second characteristic parameters are associated with mutually different mass flow rates for the actual gas through the benchmark flow rate control device, wherein the second characteristic parameters reflect differences of flow rates of the actual gas in the benchmark flow rate control device and flow rates of the standard gas in the benchmark flow rate control device, wherein the second characteristic parameters are saved to a second storage unit on which data can be swapped or updated more easily than that on the first storage unit of said flow rate control device; and
   (b3) reading the first characteristic data from the first storage unit;
   reading the second characteristic data from the second storage unit; and
   generating the plurality control parameters based on the first and second characteristic parameters thereby generating the control data; and (c) controlling the flow rate of the gas flowing on the flow path the flow rate control device using the target flow rate, the sensed flow rate, and a control parameter that is determined based on at least one of the target flow rate and the sensed flow rate from among the plurality of control parameters of control data, and generating a corrected target flow rate based on the target flow rate and the plurality of control parameters; and performing feedback control of the flow rate of gas flowing through the flow path by generating output signal for controlling a flow rate modifying unit that controls the flow rate of gas flowing through the flow path, based on the corrected target flow rate and the sensed flow rate.

2. The method according to claim 1 wherein
the step (b1) includes the steps of:
(b4) inputting the target flow rate to the flow rate control device;
(b5) circulating the standard gas through the flow path and causing the flow rate control device to control the flow rate of the standard gas without using the control parameter;
(b6) deriving the sensed flow rate;
(b7) generating the first characteristic parameter based on the input target flow rate and the derived sensed flow rate; and
(b8) repeating the steps (b4) to (b7) for different target flow rates to generate the plurality of first characteristic parameters.

3. The method according to claim 2 wherein
the step (b2) includes the steps of:
(b9) providing the benchmark flow rate control device configured to perform feedback control of flow rate of a gas flowing on a benchmark flow path based on a standard target flow rate and a standard sensed flow rate, wherein the standard target flow rate is a target value for an intended mass flow rate of the gas flowing on the benchmark flow path, and wherein the standard sensed flow rate is sensed mass flow rate of the gas flowing on the benchmark flow path;
(b10) inputting the standard target flow rate to the benchmark flow rate control device;
(b11) circulating a gas different from the benchmark gas through the benchmark flow path and causing the standard flow rate control device to control the flow rate of the gas;
(b12) deriving the standard sensed flow rate;
(b13) generating the second characteristic parameter based on the input standard target flow rate and the derived standard sensed flow rate; and
(b14) repeating the steps (b10) to (b13) for different standard target flow rates to generate the plurality of second characteristic parameters.

4. The method according to claim 3 wherein
the step (b2) further includes the step of:
(b15) prior to steps (b10) to (b14), carrying out the step (b1) for the benchmark flow rate control device to prepare the first characteristic data in relation to the benchmark flow rate control device; and
the step (b11) includes the step of:
causing the benchmark flow rate control device to control the flow rate of the gas using the first characteristic data in relation to the benchmark flow rate control device.

5. The method according to claim 3 wherein
the step (b2) includes the step of:
(b16) carrying out the step (b14) for a plurality of types of gas in order to generate a plurality of sets of the second characteristic data relating to the plurality of types of gas; and
the step (b3) includes the step of:
(b17) selecting some of the second characteristic data from among the plurality of sets of second characteristic data according to the type of the gas controlled by the flow rate control device provided in the step (a), as the second characteristic data to be used for reference.

6. The method according to claim 3 wherein
the step (b2) further includes the step of:
(b18) generating a plurality of sets of the second characteristic data that respectively include some of the plurality of second characteristic parameters generated in the step (b14) wherein the plurality of sets of the second characteristic data have mutually different ranges of the standard target flow rate during generation of the respectively included second characteristic parameters; and
the step (b3) includes the step of:
(b19) according to the range of flow rates of gas controlled by the flow rate control device provided in the step (a), selecting some of the second characteristic data from among the plurality of sets of second characteristic data, as the second characteristic data to be used for reference.

7. The method according to claim 1 wherein
the step (c) includes the steps of:
generating a corrected sensed flow rate based on the sensed flow rate and the plurality of control parameters; and
performing feedback control of the flow rate of gas flowing through the flow path, by generating output signal for controlling a rate modifying flow unit that controls the flow rate of gas flowing through the flow path, based on the target flow rate and the corrected sensed flow rate.

8. A flow rate control device for controlling flow of a gas flowing through a flow path, comprising:
a flow rate sensing unit that senses as a sensed flow rate a mass flow rate of a gas flowing through a flow path;
a flow rate modifying unit that controls a gas flow rate for the gas flowing through the flow path; and
a first storage unit that stores first characteristic data, the first characteristic data including a plurality of first characteristic parameters associated with flow characteristics of a standard gas through the flow rate control device, wherein the first characteristic parameters are associated with mutually different mass flow rates for the standard gas through the flow rate devices and reflect differences of flow rates of the standard gas in the flow rate control device and flow rates of the standard gas in a benchmark flow rate control device;
a second storage unit that stores second characteristic data, the second characteristic data including a plurality of second characteristic parameters associated with flow characteristics of an actual gas through the benchmark flow rate control device, wherein the second characteristic parameters are associated with mutually different mass flow rates for the actual gas through the benchmark flow rate control device, wherein the second characteristic parameters reflect differences of flow rates of the actual gas in the benchmark flow rate control device and flow rates of the standard gas in the benchmark flow rate control device, wherein data on the second storage unit can be swapped or updated more easily than that on the first storage unit of the flow rate control device, a control data generating unit that generates control data for the flow rate control device associated with a type of the gas flowing through the flow path, by referencing the first and second characteristic data, the control data including a plurality of control parameters respectively associated with mutually different mass flow rates, and a control unit that performs feedback control of the flow rate modifying unit based on the sensed flow rate and a target flow rate that is a target value for an intended mass flow rate of the gas flowing on the flow path so that the control unit controls the flow rate modifying unit using the target flow rate, the sensed flow rate, and a control parameter that is determined based on at least one of the target flow rate and the sensed flow rate from among the plurality of control parameters of the control data wherein the control unit generates a corrected target flow rate based on the target flow rate and the plurality of control parameters; and performs the control of the flow rate modifying unit by generating an output signal for controlling the flow rate modifying unit based on the corrected target flow rate and the sensed flow rate.

9. The flow rate control device according to claim 8 wherein the flow rate sensing unit senses the mass flow rate of the gas based on a quantity of heat transported by at least some of the gas flowing through the flow path.

10. The flow rate control device according to claim 8 wherein the flow rate sensing unit senses the mass flow rate of the gas based on pressures of the gas at different locations in the flow path.

11. The flow rate control device according to claim 8 wherein the second characteristic data is data selected from among a plurality of sets of second characteristic candidate data in which the second characteristic parameters are respectively stored, wherein the sets of second characteristic candidate data reflect characteristics of mutually different types of gas.

12. The flow rate control device according to claim 8 wherein the second characteristic data is data selected from among a plurality of sets of second characteristic candidate data in which the second characteristics are respectively stored, wherein the mass flow rates of the second characteristic parameters respectively stored in each of the plurality of sets of the second characteristic candidate data have mutually different ranges.

13. The flow rate control device according to claim 8 wherein the control unit generates a corrected target flow rate based on the target flow rate and the plurality of control parameters; and performs the control of the flow rate modifying unit by generating output signal for controlling the flow rate modifying unit based on the corrected target flow rate and the sensed flow rate.

14. The flow rate control device according to claim 8 wherein the control unit generates a corrected sensed flow rate based on the sensed flow rate and the plurality of control parameters; and performs the control of the flow rate modifying unit by generating output signal for controlling the flow rate modifying unit based on the corrected target flow rate and the sensed flow rate.

15. A computer program product for controlling flow rate of a gas flowing on a flow path, wherein the computer program product includes:

a computer-readable storage medium; and a computer program recorded onto the storage medium;

wherein the computer program includes a module that, in a flow rate control device having a flow rate modifying unit that controls a gas flow rate for a gas flowing through the flow path, and being configured to perform feedback control of the flow rate of the gas flowing on the flow path based on a target flow rate and a sensed flow, wherein the target flow rate is a target value for an intended mass flow rate of the gas flowing on the flow path, wherein the sensed flow rate is a sensed mass flow rate of the gas flowing on the flow path, accomplishes a function by which, while referring to control data associated with a type of the gas flowing through the flow path and including a plurality of control parameters respectively associated with mutually different mass flow rates, wherein the control data is obtained by (i) providing first characteristic data that includes a plurality of first characteristic parameters associated with flow characteristics of a standard gas through the flow rate control device, wherein the first characteristic parameters are associated with mutually different mass flow rates for the standard gas through the provided flow rate control device, wherein the first characteristic parameters reflect differences of flow rates of the standard gas in the flow rate control device and flow rates of the standard gas in a benchmark flow rate control device and, wherein the first characteristic data is saved to a first storage unit of the flow rate control device;

(ii) providing second characteristic data that includes a plurality of second characteristic parameters associated with flow characteristics of an actual gas through a benchmark flow rate control device, wherein the second characteristic parameters are associated with mutually different mass flow rates for the actual gas through the benchmark flow rate control device, wherein the second characteristic parameters reflect differences of flow rates of the actual gas in the benchmark flow rate control device and flow rates of the standard gas in the benchmark flow rate control device;

(iii) saving the second characteristic data to a second storage unit on which data can be swapped or updated more easily than that on the first storage unit of the flow rate control device; and, (iv) reading the first characteristic data from the first storage unit; and (v) reading the second characteristic data from the second storage unit;

(vi) generating a plurality of control parameters based on the first and second characteristic parameters thereby generating control data;

(vii) generating a corrected target flow rate based on the target flow rate and the plurality of control parameters;

(viii) controlling the flow rate modifying unit by generating an output signal for controlling the flow rate modifying unit based on the corrected target flow rate and the sensed flow rate.

* * * * *